United States Patent
Ji et al.

(10) Patent No.: US 11,770,802 B2
(45) Date of Patent: Sep. 26, 2023

(54) REDUCING LATENCY FOR CLOSED LOOP SIDELINK COMMUNICATIONS FOR NON-TERRESTRIAL NETWORKS

(71) Applicant: QUALCOMM Incorporated, San Diego, CA (US)

(72) Inventors: Lianghai Ji, San Diego, CA (US); Qiang Wu, San Diego, CA (US); Mehmet Izzet Gurelli, San Diego, CA (US); Weimin Duan, San Diego, CA (US); Karthik Anantha Swamy, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 215 days.

(21) Appl. No.: 17/472,011

(22) Filed: Sep. 10, 2021

(65) Prior Publication Data

US 2023/0077735 A1   Mar. 16, 2023

(51) Int. Cl.
*H04W 72/02* (2009.01)
*H04W 72/21* (2023.01)
*H04W 72/1263* (2023.01)
*H04W 84/06* (2009.01)

(52) U.S. Cl.
CPC ....... *H04W 72/02* (2013.01); *H04W 72/1263* (2013.01); *H04W 72/21* (2023.01); *H04W 84/06* (2013.01)

(58) Field of Classification Search
CPC . H04W 72/02; H04W 72/21; H04W 72/1263; H04W 84/06
See application file for complete search history.

(56) References Cited

U.S. PATENT DOCUMENTS

| | | | |
|---|---|---|---|
| 2019/0364492 A1 | 11/2019 | Azizi et al. | |
| 2021/0105787 A1* | 4/2021 | Park | H04L 43/16 |
| 2022/0376829 A1* | 11/2022 | Zhao | H04W 4/70 |

OTHER PUBLICATIONS

Ghosh et al. "5G Evolution: View on 5G Cellular Technology Beyond 3GPP Release 15" IEEE Access vol. 7 2019 (Year: 2019).*
International Search Report and Written Opinion—PCT/US2022/036713—ISA/EPO—dated Oct. 6, 2022 (2106651WO).

* cited by examiner

*Primary Examiner* — Basil Ma
(74) *Attorney, Agent, or Firm* — Holland & Hart LLP

(57) ABSTRACT

Methods, systems, and devices for reducing latency for closed loop sidelink communications for non-terrestrial networks (NTNs) are described. In some examples, a first user equipment (UE) may transmit, to a network entity, a message requesting an allocation of sidelink resources for the first UE and an allocation of sidelink resources for a second UE. The first UE may receive, from the network entity in response to the request message, an indication of a first set of sidelink resources for the first UE. In some examples, the first UE may transmit one or more data messages to the second UE, including an indication of a second set of sidelink resources, an indication that the network entity may directly allocate the second set of sidelink resources, or both. In some example, the first UE may receive one or more data messages from the second UE on the second set of sidelink resources.

28 Claims, 18 Drawing Sheets

REDUCING LATENCY FOR CLOSED LOOP SIDELINK COMMUNICATIONS FOR NON-TERRESTRIAL NETWORKS

FIELD OF TECHNOLOGY

The following relates to wireless communications, including reducing latency for closed loop sidelink communications for non-terrestrial networks (NTNs).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, UEs may communicate with each other in a non-terrestrial network (NTN), for example in NTN-controlled sidelink communications (e.g., mode 1). For example, two or more UEs may exchange data between one another via sidelink, where the sidelink communication between the UEs may be controlled by an NTN base station in sidelink mode 1. For example, the NTN base station may assign a first sidelink resource to a UE and a second sidelink resource to a respective UE, where the sidelink resources may be used for direct communication between UEs.

SUMMARY

The described techniques relate to improved methods, systems, devices, and apparatuses that support reducing latency for closed loop sidelink communications for non-terrestrial networks (NTNs). Generally, the described techniques provide for a first user equipment transmitting a resource allocation request for both the first UE and a peer sidelink UE, to a network entity (e.g., a base station, a relay, a satellite). For example, the UE may transmit the resource allocation request for the closed loop sidelink communication, indicating both a request for sidelink resources at the first UE and a request for sidelink resources at a second UE. The network entity may receive the resource allocation request and may allocate resources for the first UE and the second UE accordingly. In some examples, the network entity may transmit a first resource allocation to the first UE, including multiple sidelink resources for the first UE to indicate to different peer UEs. For example, the first resource allocation may include a first set of sidelink resources and a second set of sidelink resources, where the first UE may receive the first resource allocation and may transmit data to the second UE using the first sidelink resource. In such examples, the first UE may indicate the second set of sidelink resources to the second UE where the second UE may use the second set of sidelink resources to transmit data to the first UE. In some examples, the network entity may transmit the first resource allocation to the first UE, including an indication that the network entity may indicate the second set of sidelink resources directly to the second UE. That is, the network entity may transmit the first resource allocation to the first UE including a first set of sidelink resources for the UE to transmit data to the second UE and including an indication that the network entity may indicate the second set of sidelink resources directly to the second UE. As such, the network entity may transmit a second resource allocation to the second UE directly, where the second UE may use the second set of sidelink resources to transmit data to the first UE.

A method for wireless communication at a first wireless device is described. The method may include transmitting a message requesting both an allocation of sidelink resources for the first wireless device to use to transmit to at least a second wireless device on a sidelink and an allocation of sidelink resources for at least the second wireless device to use to transmit to at least the first wireless device on the sidelink, receiving, in response to the transmitted request message, an indication of a first set of sidelink resources for the first wireless device, transmitting one or more messages to at least the second wireless device on the first set of sidelink resources, and receiving one or more messages from at least the second wireless device on a second set of sidelink resources.

An apparatus for wireless communication at a first wireless device is described. The apparatus may include a processor, memory coupled with the processor, and instructions stored in the memory. The instructions may be executable by the processor to cause the apparatus to transmit a message requesting both an allocation of sidelink resources for the first wireless device to use to transmit to at least a second wireless device on a sidelink and an allocation of sidelink resources for at least the second wireless device to use to transmit to at least the first wireless device on the sidelink, receive, in response to the transmitted request message, an indication of a first set of sidelink resources for the first wireless device, transmit one or more messages to at least the second wireless device on the first set of sidelink resources, and receive one or more messages from at least the second wireless device on a second set of sidelink resources.

Another apparatus for wireless communication at a first wireless device is described. The apparatus may include means for transmitting a message requesting both an allocation of sidelink resources for the first wireless device to use to transmit to at least a second wireless device on a sidelink and an allocation of sidelink resources for at least the second wireless device to use to transmit to at least the first wireless device on the sidelink, means for receiving, in response to the transmitted request message, an indication of a first set of sidelink resources for the first wireless device, means for transmitting one or more messages to at least the second wireless device on the first set of sidelink resources, and means for receiving one or more messages from at least the second wireless device on a second set of sidelink resources.

A non-transitory computer-readable medium storing code for wireless communication at a first wireless device is described. The code may include instructions executable by a processor to transmit a message requesting both an allocation of sidelink resources for the first wireless device to use to transmit to at least a second wireless device on a sidelink and an allocation of sidelink resources for at least the second wireless device to use to transmit to at least the first wireless device on the sidelink, receive, in response to the transmitted request message, an indication of a first set of sidelink resources for the first wireless device, transmit one or more messages to at least the second wireless device on the first set of sidelink resources, and receive one or more messages from at least the second wireless device on a second set of sidelink resources.

Some examples of the method, apparatuses, and non-transitory computer-readable medium described herein may further include operations, features, means, or instructions for receiving an indication of the second set of sidelink resources for at least the second wireless device and transmitting, to at least the second wireless device, a message identifying the second set of sidelink resources for at least the second wireless device.

In some examples of the method, apparatuses, and non-transitory computer-readable medium described herein, at least one of the one or more messages transmitted to at least the second wireless device on the first set of sidelink resources identify the second set of sidelink resources for at least the second wireless device.

Some examples of the method, apparatuses, and non-transitory computer-readable medium described herein may further include operations, features, means, or instructions for transmitting, to at least the second wireless device at least in part in response to the received indication of the first set of sidelink resources for the first wireless device, an indication that a network entity will transmit to at least the second wireless device a message identifying the second set of sidelink resources for at least the second wireless device.

Some examples of the method, apparatuses, and non-transitory computer-readable medium described herein may further include operations, features, means, or instructions for receiving, from the network entity, the indication that the network entity will transmit to at least the second wireless device the message identifying the second set of sidelink resources for at least the second wireless device, where the indication transmitted to at least the second wireless device may be transmitted in response to receiving the indication from the network entity.

In some examples of the method, apparatuses, and non-transitory computer-readable medium described herein, the indication that the network entity will transmit the message identifying the second set of sidelink resources may be transmitted in at least one message of the one or more messages transmitted by the first wireless device to at least the second wireless device on the first set of sidelink resources.

Some examples of the method, apparatuses, and non-transitory computer-readable medium described herein may further include operations, features, means, or instructions for transmitting, in the message indicating that the network entity will transmit the second set of sidelink resources, an indication of a radio network temporary identifier (RNTI), a time resource, a frequency resource, or any combination thereof, that the network entity will use to transmit the message identifying the second set of sidelink resources.

Some examples of the method, apparatuses, and non-transitory computer-readable medium described herein may further include operations, features, means, or instructions for receiving, from the network entity, the indication of the RNTI, the time resource, the frequency resource, or any combination thereof.

In some examples of the method, apparatuses, and non-transitory computer-readable medium described herein, transmitting the message requesting both the allocation of sidelink resources for the first wireless device and the allocation of sidelink resources for at least the second wireless device may include operations, features, means, or instructions for selecting a configuration for the message from a set of configurations based on the configuration identifying that the message requests allocations of sidelink resources for both wireless devices of the sidelink and transmitting, according to the selected configuration, the message requesting both the allocation of sidelink resources for the first wireless device and the allocation of sidelink resources for at least the second wireless device.

In some examples of the method, apparatuses, and non-transitory computer-readable medium described herein, the selected configuration for the message includes one of a set of random access channel (RACH) preambles, a sidelink scheduling request (SR) configuration, a destination identifier of a buffer status report (BSR), or a logical channel group (LCG) identifier of the BSR.

Some examples of the method, apparatuses, and non-transitory computer-readable medium described herein may further include operations, features, means, or instructions for transmitting, in the message requesting both the allocation of sidelink resources for the first wireless device and the allocation of sidelink resources for at least the second wireless device, an indication of a size range, latency requirement, or both, for the second set of sidelink resources for at least the second wireless device.

In some examples of the method, apparatuses, and non-transitory computer-readable medium described herein, the message may be transmitted to a base station of an NTN, and the response to the transmitted request message may be received from the base station of the NTN.

A method for wireless communication at a second wireless device is described. The method may include receiving one or more messages from a first wireless device on a first set of sidelink resources of a sidelink, receiving, exclusive of a request by the second wireless device to a network entity for an allocation of sidelink resources for the second wireless device, an indication of a second set of sidelink resources for the second wireless device to use to transmit to at least the first wireless device on the sidelink in response to the one or more messages from the first wireless device, and transmitting one or more messages to the first wireless device on the second set of sidelink resources.

An apparatus for wireless communication at a second wireless device is described. The apparatus may include a processor, memory coupled with the processor, and instructions stored in the memory. The instructions may be executable by the processor to cause the apparatus to receive one or more messages from a first wireless device on a first set of sidelink resources of a sidelink, receive, exclusive of a request by the second wireless device to a network entity for an allocation of sidelink resources for the second wireless device, an indication of a second set of sidelink resources for the second wireless device to use to transmit to at least the first wireless device on the sidelink in response to the one or more messages from the first wireless device, and transmit one or more messages to the first wireless device on the second set of sidelink resources.

Another apparatus for wireless communication at a second wireless device is described. The apparatus may include means for receiving one or more messages from a first wireless device on a first set of sidelink resources of a sidelink, means for receiving, exclusive of a request by the second wireless device to a network entity for an allocation of sidelink resources for the second wireless device, an indication of a second set of sidelink resources for the second wireless device to use to transmit to at least the first wireless device on the sidelink in response to the one or more messages from the first wireless device, and means for transmitting one or more messages to the first wireless device on the second set of sidelink resources.

A non-transitory computer-readable medium storing code for wireless communication at a second wireless device is described. The code may include instructions executable by a processor to receive one or more messages from a first wireless device on a first set of sidelink resources of a sidelink, receive, exclusive of a request by the second wireless device to a network entity for an allocation of sidelink resources for the second wireless device, an indication of a second set of sidelink resources for the second wireless device to use to transmit to at least the first wireless device on the sidelink in response to the one or more messages from the first wireless device, and transmit one or more messages to the first wireless device on the second set of sidelink resources.

Some examples of the method, apparatuses, and non-transitory computer-readable medium described herein may further include operations, features, means, or instructions for receiving, from the first wireless device, the indication of the second set of sidelink resources for the second wireless device.

In some examples of the method, apparatuses, and non-transitory computer-readable medium described herein, at least one of the one or more messages received from the first wireless device on the first set of sidelink resources of the sidelink identify the second set of sidelink resources for the second wireless device.

Some examples of the method, apparatuses, and non-transitory computer-readable medium described herein may further include operations, features, means, or instructions for receiving, from the first wireless device, an indication that the network entity will transmit to the second wireless device a message identifying the second set of sidelink resources for the second wireless device, the indication of the second set of sidelink resources to be received from the network entity based on receiving the indication that the network entity will transmit the message identifying the second set of sidelink resources.

In some examples of the method, apparatuses, and non-transitory computer-readable medium described herein, the indication that the network entity will transmit the message identifying the second set of sidelink resources may be received in at least one message of the one or more messages received from the first wireless device on the first set of sidelink resources.

Some examples of the method, apparatuses, and non-transitory computer-readable medium described herein may further include operations, features, means, or instructions for receiving, in the message indicating that the network entity will transmit a message identifying the second set of sidelink resources, an indication of an RNTI, a time resource, a frequency resource, or any combination thereof, that the network entity will use to transmit the message identifying the second set of sidelink resources.

In some examples of the method, apparatuses, and non-transitory computer-readable medium described herein, receiving the indication of the second set of sidelink resources may include operations, features, means, or instructions for identifying, at least one of an RNTI or a preconfigured set of resources for the second wireless device to use to receive the indication of the second set of sidelink resources from the network entity and receiving the indication of the second set of sidelink resources from the network entity according to the at least one of the RNTI or the preconfigured set of resources.

In some examples of the method, apparatuses, and non-transitory computer-readable medium described herein, the network entity includes a base station of an NTN.

A method for wireless communication at a network entity is described. The method may include receiving, from a first wireless device, a message requesting both an allocation of sidelink resources for the first wireless device to use to transmit to at least a second wireless device and an allocation of sidelink resources for at least the second wireless device to use to transmit to at least the first wireless device and transmitting, in response to the received request, an indication of a first set of sidelink resources for the first wireless device to the first wireless device and an indication of a second set of sidelink resources for the second wireless device.

An apparatus for wireless communication at a network entity is described. The apparatus may include a processor, memory coupled with the processor, and instructions stored in the memory. The instructions may be executable by the processor to cause the apparatus to receive, from a first wireless device, a message requesting both an allocation of sidelink resources for the first wireless device to use to transmit to at least a second wireless device and an allocation of sidelink resources for at least the second wireless device to use to transmit to at least the first wireless device and transmit, in response to the received request, an indication of a first set of sidelink resources for the first wireless device to the first wireless device and an indication of a second set of sidelink resources for the second wireless device.

Another apparatus for wireless communication at a network entity is described. The apparatus may include means for receiving, from a first wireless device, a message requesting both an allocation of sidelink resources for the first wireless device to use to transmit to at least a second wireless device and an allocation of sidelink resources for at least the second wireless device to use to transmit to at least the first wireless device and means for transmitting, in response to the received request, an indication of a first set of sidelink resources for the first wireless device to the first wireless device and an indication of a second set of sidelink resources for the second wireless device.

A non-transitory computer-readable medium storing code for wireless communication at a network entity is described. The code may include instructions executable by a processor to receive, from a first wireless device, a message requesting both an allocation of sidelink resources for the first wireless device to use to transmit to at least a second wireless device and an allocation of sidelink resources for at least the second wireless device to use to transmit to at least the first wireless device and transmit, in response to the received request, an indication of a first set of sidelink resources for the first wireless device to the first wireless device and an indication of a second set of sidelink resources for the second wireless device.

In some examples of the method, apparatuses, and non-transitory computer-readable medium described herein, transmitting the indication of the first set of sidelink resources and the indication of the second set of sidelink resources may include operations, features, means, or instructions for transmitting, to the first wireless device in response to the received request, a message that includes both the indication of the first set of sidelink resources for the first wireless device and the indication of the second set of sidelink resources for the second wireless device.

Some examples of the method, apparatuses, and non-transitory computer-readable medium described herein may further include operations, features, means, or instructions for transmitting, in the message indicating that the network entity will transmit a message identifying the second set of sidelink resources, an indication of an RNTI, a time resource, a frequency resource, or any combination thereof, that the network entity will use to transmit the message identifying the second set of sidelink resources.

Some examples of the method, apparatuses, and non-transitory computer-readable medium described herein may further include operations, features, means, or instructions for transmitting, to the first wireless device, an indication that the network entity will transmit to the second wireless device a message identifying the second set of sidelink resources for the second wireless device.

In some examples of the method, apparatuses, and non-transitory computer-readable medium described herein, transmitting the indication of the first set of sidelink resources and the indication of the second set of sidelink resources may include operations, features, means, or instructions for transmitting, to the first wireless device in response to the received request, a first message that includes the indication of the first set of sidelink resources for the first wireless device and transmitting, to the second wireless device in response to the received request and exclusive of a request from the second wireless device for the allocation of sidelink resources for the second wireless device, a second message that includes the indication of the second set of sidelink resources for the second wireless device.

Some examples of the method, apparatuses, and non-transitory computer-readable medium described herein may further include operations, features, means, or instructions for determining, based on the received message requesting both the allocation of sidelink resources for the first wireless device and the allocation of sidelink resources for the second wireless device and a configuration from a set of configurations selected by the first wireless device for transmitting the message requesting both the allocation of sidelink resources for the first wireless device and the allocation of sidelink resources for the second wireless device, that the received message requests allocations of sidelink resources for both wireless devices of a sidelink.

In some examples of the method, apparatuses, and non-transitory computer-readable medium described herein, the selected configuration for the message includes at least one of a set of RACH preambles, a sidelink SR configuration, a destination identifier of a BSR, or a LCG identifier of the BSR.

Some examples of the method, apparatuses, and non-transitory computer-readable medium described herein may further include operations, features, means, or instructions for receiving, in the message requesting both the allocation of sidelink resources for the first wireless device and the allocation of sidelink resources for the second wireless device, an indication of a size range, latency requirement, or both, for the indication of the second set of sidelink resources for the second wireless device.

DETAILED DESCRIPTION

Figure 1:
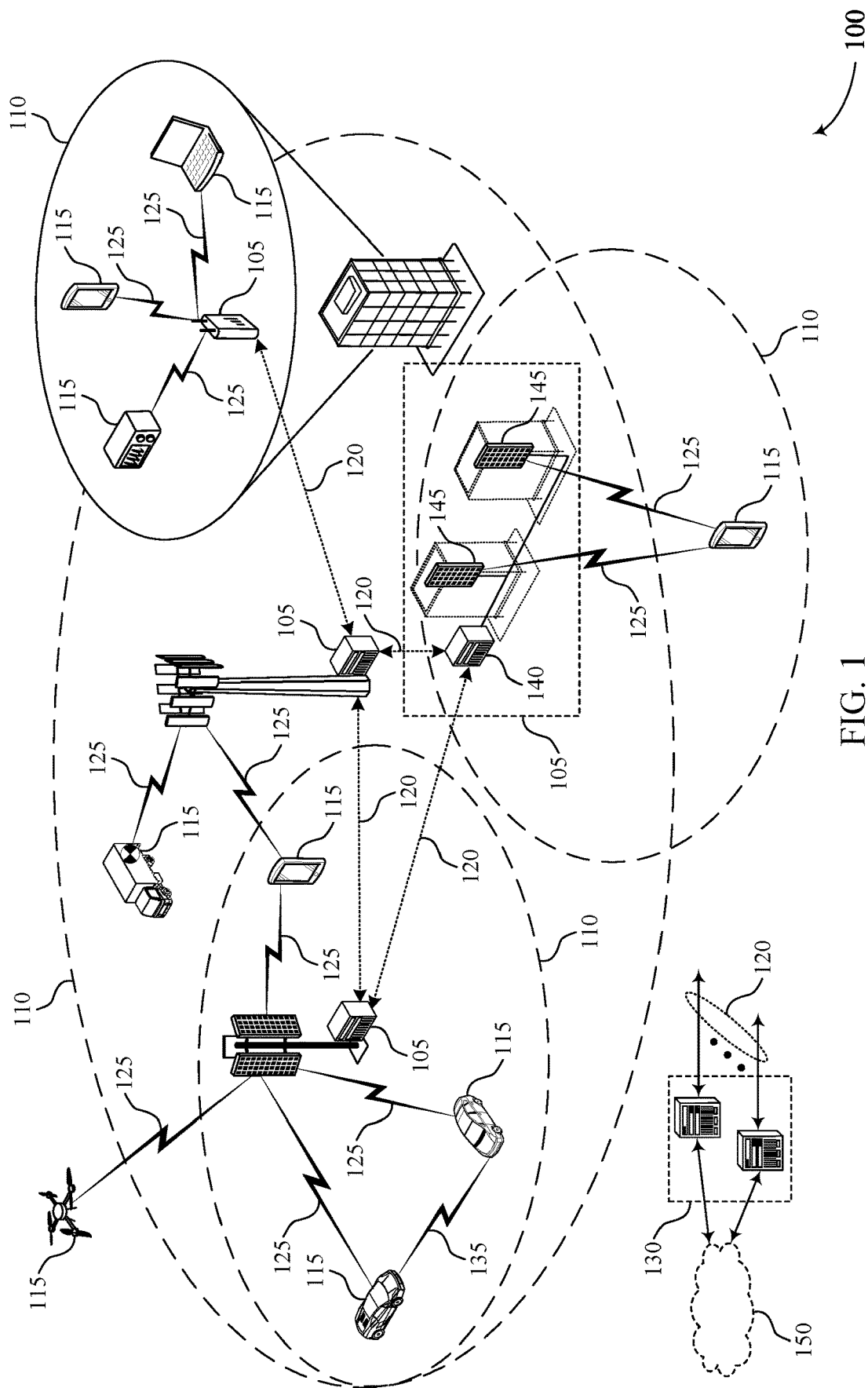
FIGS. 1 and 2 illustrate examples of wireless communications systems that support reducing latency for closed loop sidelink communications for non-terrestrial networks (NTNs) in accordance with aspects of the present disclosure.

In some cases, user equipments (UEs) may communicate with each other in accordance with a sidelink communication, for example, in mode 1. In mode 1, a UE may receive a grant for sidelink channel access from a base station. In some cases, UEs may communicate with each other in an NTN-controlled sidelink communication in mode 1. For example, two or more local UEs may exchange data between one another via sidelink, where the sidelink communication between the UEs may be controlled by a satellite base station in sidelink mode 1. For example, the base station may assign a transmit resource to each sidelink UE requesting sidelink channel access, where each assigned transmit resource may be used for direct communication between UEs.

Some wireless communications systems support closed loop sidelink communication, where an initial transmission, and in some cases a request for response, may be transmitted from a first UE to a second UE and a response may be transmitted from the second UE to the first UE. However, in cases where the first UE and the second UE operate in sidelink mode 1, the resource request and resource allocation procedures may span a relatively long period of time. For example, for closed loop sidelink communications, there may be two or more resource request and resource allocation procedures, involving two or more round trip time (RTT) occurrences between UEs and the base station. In some cases, the signal propagation distance between UEs and the base station may be significantly large (e.g., in an NTN communications system), introducing a relatively large latency (e.g., on the order of 100s of milliseconds) for closed loop sidelink communications. For example, an NTN closed loop sidelink communication environment with two or more resource request and resource allocation procedures (e.g., involving respective RTT occurrences), may result in closed loop sidelink communications failing to satisfy a latency threshold.

In some examples, the first UE may send a sidelink resource request for both the first UE and the second UE to the base station. For example, the first UE may transmit a resource allocation request for the closed loop sidelink communication, indicating both a request for sidelink resources at the first UE and a request for sidelink resources at the second UE, mitigating an explicit request from the second UE for sidelink resources. The base station may receive the resource allocation request and may allocate resources for the first UE and the second UE accordingly. In some examples, the base station may transmit an indication of a first set of sidelink resources to the first UE, including multiple sidelink resources for the first UE to indicate to peer sidelink UEs. For example, the indication of the first set of sidelink resources may include a first set of sidelink resources and a second set of sidelink resources, where the first UE may receive the indication of the first set of sidelink resources and may transmit data to the second UE using the first set of sidelink resources. Additionally, the first UE may indicate the second set of sidelink resources to the second UE where the second UE may use the second set of sidelink resources to transmit a response message back to the first UE. In some examples, the base station may transmit the indication of the first set of sidelink resources, to the first UE, along with an indication that the base station may transmit an indication of a second set of sidelink resources directly to the second UE. For example, the first UE may receive the indication of the first set of sidelink resources and may transmit data to the second UE using the first set of sidelink resources. Additionally, the first UE may indicate that the base station may transmit an indication of the second set of sidelink resources to the second UE directly. As such, the base station may transmit the indication of the second set of sidelink resources to the second UE, where the second UE may use the second set of sidelink resources to transmit a response message back to the first UE.

Aspects of the disclosure are initially described in the context of wireless communications systems. Aspects of the disclosure are then described in the context of process flows. Aspects of the disclosure are further illustrated by and described with reference to apparatus diagrams, system diagrams, and flowcharts that relate to reducing latency for closed loop sidelink communications for NTNs.

FIG. 1 illustrates an example of a wireless communications system 100 that supports reducing latency for closed loop sidelink communications for non-terrestrial networks in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, an initiating UE 115 may send a sidelink resource request for both the initiating UE 115 and a peer sidelink UE 115 to a base station 105. For example, the initiating UE 115 may transmit a resource allocation request for the closed loop sidelink communication, indicating both a request for sidelink resources at the initiating UE 115 and a request for sidelink resources at the peer UE 115. The base station 105 may receive the resource allocation request and may allocate resources for the initiating UE 115 and the peer UE 115 accordingly.

Figure 2:
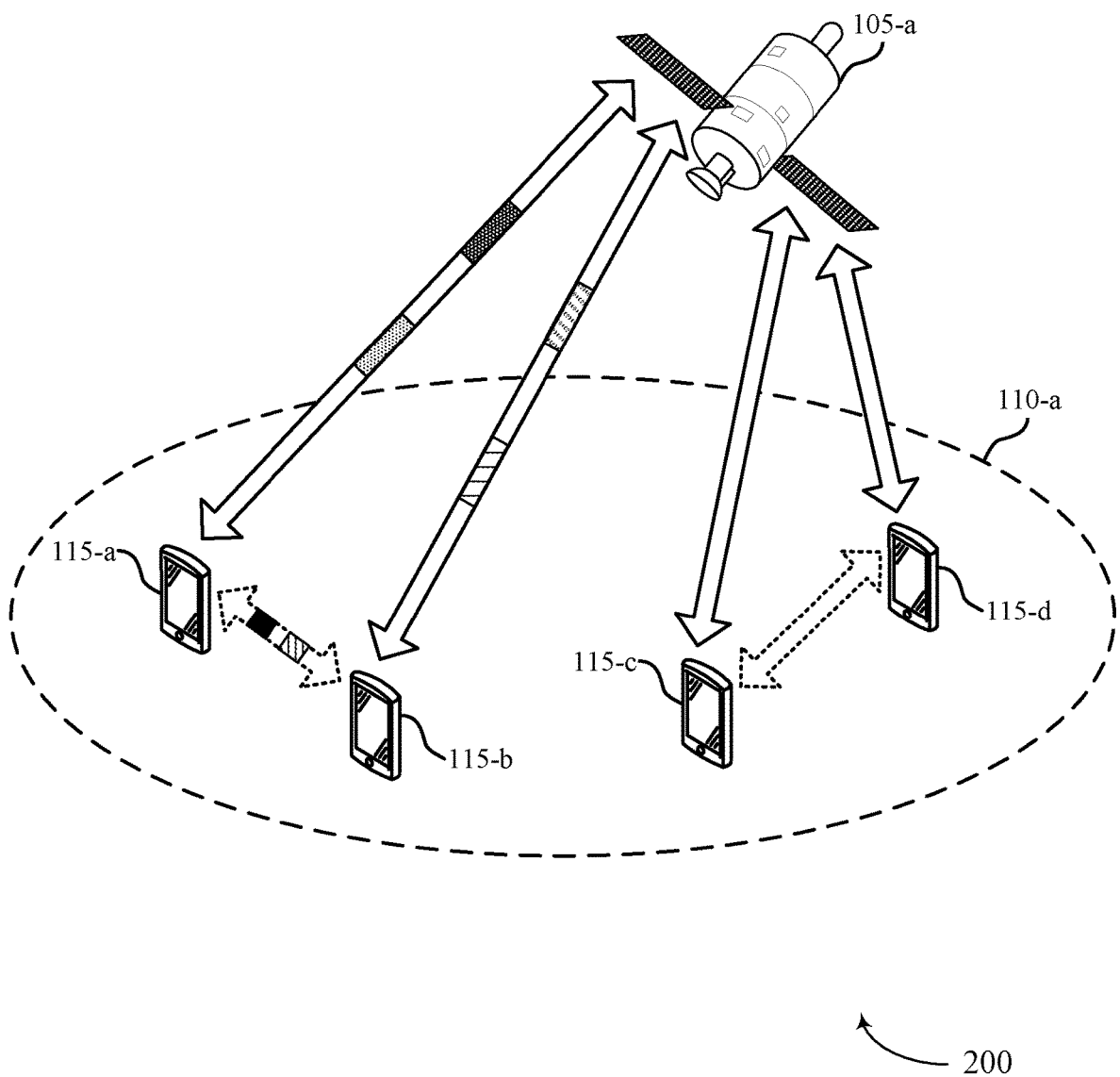

FIG. 2 illustrates an example of a wireless communications system 200 that supports reducing latency for closed loop sidelink communications for non-terrestrial networks in accordance with aspects of the present disclosure. The wireless communications system 200 may implement or be implemented by aspects of the wireless communications system 100. For example, the wireless communications system 200 may include a base station 105-a and a UE 115-a, which may be examples of corresponding devices described with reference to FIG. 1. In some cases, the base station 105-a may be an example of a network entity, a satellite, a relay note, a network node, an IAB node, among other devices configured to provide service to UEs 115. The base station 105-a may communicate with the UE 115-a, a UE 115-b, a UE 115-c, and a UE 115-d in a geographic coverage area 110-a, which may be an example of a geographic coverage area 110 described with reference to FIG. 1. The UEs 115 may communicate in accordance with closed loop sidelink communication, utilizing signaling from the base station 105-a to gain access to sidelink channels, where in some cases, the UE 115-a may transmit a first resource request 205 to the base station 105-a indicating both a request for sidelink resources at the UE 115-a and a request for sidelink resources at the UE 115-b.

In some cases, UEs 115 may communicate with each other in accordance with a sidelink communication, for example, mode 1. In mode 1, a UE 115-a (e.g., a transmitting device) may receive a grant for sidelink channel access. For example, the UE 115-a may transmit a first resource request 205 to the base station 105-a and, in accordance with mode 1, the UE 115-a may receive a first resource allocation 210 from the base station 105-a to access a sidelink channel (e.g., between UE 115-a and UE 115-b).

In some cases, the UEs 115 may communicate with each other in an NTN controlled sidelink communication in mode 1. For example, two or more local UEs 115 (e.g., UE 115-a and UE 115-b) may exchange data between one another via sidelink, for example, in a rural area with relatively poor terrestrial network (TN) coverage but with relatively good NTN coverage. In some cases, the sidelink communication between the UEs 115 may be controlled by the base station 105-a (e.g., an NTN gNB) in sidelink mode 1. For example, the base station 105-a may assign a transmit resource (e.g., first resource allocation 210, a second resource allocation 225) to a respective UE 115, where the assigned transmit resource may be used for direct communication between UEs 115.

Some wireless communications support closed loop sidelink communication, where an initial transmission, and in some cases a request for response, may be transmitted from a first UE 115 to a second UE 115 and a response may be transmitted from the second UE 115 to the first UE 115 (e.g., in a sidelink CSI reporting procedure, a PC5-RRC reconfiguration, an upper layer closed loop data communication). For example, UE 115-a may transmit data transmission 215 to the UE 115-b, where the data transmission 215 from the UE 115-a may trigger the UE 115-b to send back a response message 230. However, in cases where UE 115-a and UE 115-b operate in sidelink mode 1, the resources the UEs 115 use for transmission may be assigned by the base station 105-a, involving a resource request and resource allocation procedure for each transmission. As such, for closed loop sidelink communications, there may be two or more resource request and resource allocation procedures, involving two or more RTT occurrences between UEs 115 and the base station 105-a. For example, the UE 115-a may transmit the first resource request 205 to the base station 105-a and the base station 105-a may transmit the first resource allocation 210 to the UE 115-a, resulting in a resource request and resource allocation procedure spanning a full RTT between the UE 115-a and the base station 105-a. The UE 115-a may use the first resource allocation 210 to transmit data transmission 215 to the UE 115-b, where the UE 115-b may receive the data transmission 215, triggering the UE 115-b to transmit the response message 230 back to the UE 115-a. As such, the UE 115-b may transmit a second resource request 220 to the base station 105-a and the base station 105-a may transmit a second resource allocation 220 to the UE 115-b, resulting in another resource request and resource allocation procedure spanning a full RTT between the UE 115-b and the base station 105-a. In some cases, the signal propagation distance between UEs 115 and the base station 105-a may be significantly large (e.g., approximately 35 to 37 kilometers), introducing a relatively large latency (e.g., on the order of 100s of milliseconds) for closed loop sidelink communications. For example, an NTN closed loop sidelink communication environment with two or more resource request and resource allocation procedures (e.g., involving respective RTT occurrences), may result in closed loop sidelink communications failing to satisfy a latency threshold.

The NTN closed loop sidelink communication environment may fail to satisfy different latency thresholds. In some cases, a sidelink CSI reporting MAC-CE may expire if the UE 115-b fails to transmit the response message 230 (e.g., a sidelink MAC-CE) a latency threshold (e.g., 3-20 ms) after receiving a sidelink CSI report request (e.g., as or within data transmission 215) from the UE 115-a. In other cases, upper layer communications may be associated with latency thresholds. For example, NAS communications, application layer communications, among other upper layer communications may correspond to a timely interaction between UEs 115 for specific services. In yet other cases, UE 115-a may perform a PC5 reconfiguration, where the UE 115-a may transmit an RRCReconfigurationSidelink (e.g., as or within the data transmission 215) to the UE 115-b. In such cases, the UE 115-a may declare a sidelink radio link failure (RLF) if the UE 115-a does not receive an RRCReconfigurationCompleteSidelink message (e.g., as or within response message 230) from the UE 115-b before a timer expires (e.g., a timer T400). As such, it may be beneficial to forego one or more RTT occasions in an NTN closed loop sidelink communication environment, for example, to reduce system latency.

In some examples, an initiating UE 115 may send a sidelink resource request for both the initiating UE 115 and a peer sidelink UE 115 to the base station 105-a. For example, the UE 115-a may transmit the first resource request 205 for the closed loop sidelink communication, indicating both a request for sidelink resources at the UE 115-a and a request for sidelink resources at the UE 115-b. The base station 105-a may receive the first resource request 205 and may allocate resources for the UE 115-a and the UE 115-b accordingly. In some examples, the base station 105-a may transmit the first resource allocation 210 to the UE 115-a, including multiple sidelink resources for different sidelink UEs 115. That is, the base station 105-a may transmit the first resource allocation 210 to the UE 115-a including a first set of sidelink resources for UE 115-a to transmit the data transmission 215 as well as one or more other sets of sidelink resources for receiving UEs 115 to use for subsequent transmissions (e.g., response message 230). For example, the first resource allocation 210 may include a first set of sidelink resources and a second set of sidelink resources, where the UE 115-a may receive the first resource allocation 210 and may transmit the data transmission 215 to the UE 115-b using the first sidelink resource. Additionally, the UE 115-a may indicate the second set of sidelink resources to the UE 115-b where the UE 115-b may use the second set of sidelink resources to transmit the response message 230 back to the UE 115-a. In some examples, the base station 105-a may transmit the first resource allocation 210 to the UE 115-a, where the first resource allocation 210 may include an indication that the base station 105-a may transmit the second resource allocation 225 directly to the UE 115-b. That is, the base station 105-a may transmit the first resource allocation 210 to the UE 115-a including a first set of sidelink resources for the UE 115-a to transmit the data transmission 215 and including an indication that the base station 105-a may transmit the second resource allocation 225 to the UE 115-b. For example, the first resource allocation 210 may include a first set of sidelink resources and an indication of the second resource allocation 225, where the UE 115-a may receive the first resource allocation 210 and may transmit the data transmission 215 to the UE 115-b using the first set of sidelink resources. Additionally, the UE 115-a may indicate that the base station 105-a may transmit the second resource allocation 225 to the UE 115-b directly. As such, the base station 105-a may transmit the second resource allocation to the UE 115-b, where the UE 115-b may use the second set of sidelink resources to transmit the response message 230 back to the UE 115-a.

Configuring devices to use the techniques as described herein may enable devices to mitigate an RTT occurrence, for example, in an NTN closed loop sidelink communication environment, reducing signaling overhead, reducing system latency, and in some cases, satisfying one or more latency thresholds.

Figure 3:
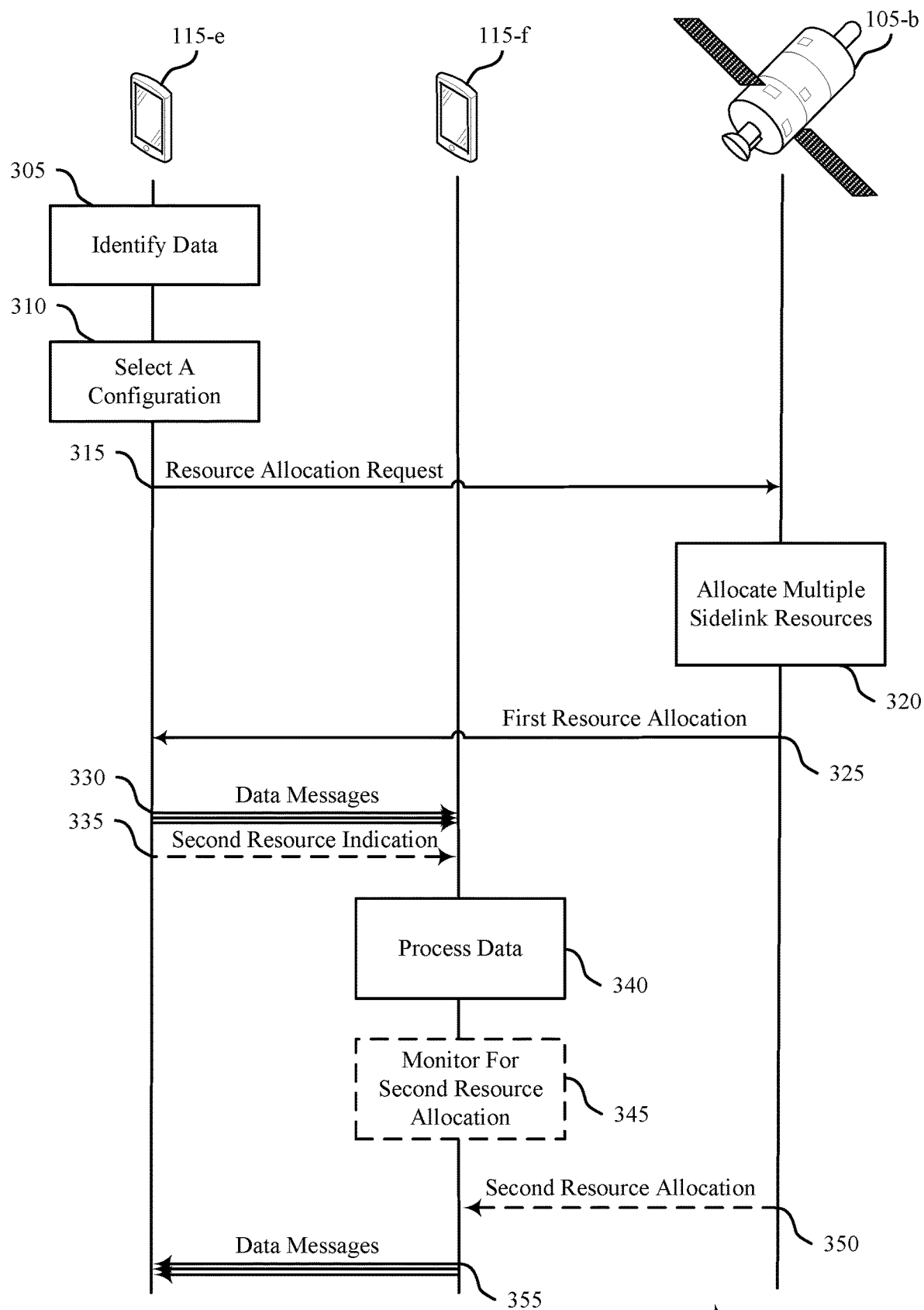
FIGS. 3 through 5 illustrate examples of process flows that support reducing latency for closed loop sidelink communications for NTNs in accordance with aspects of the present disclosure.

FIG. 3 illustrates an example of a process flow 300 that supports reducing latency for closed loop sidelink communications for non-terrestrial networks in accordance with aspects of the present disclosure. In some examples, the process flow 300 may implement aspects of wireless communications systems 100 or 200. For example, process flow 300 may include UE 115-e, UE 115-f, and base station 105-b, which may be examples of corresponding devices as described with reference to FIGS. 1 and 2. In some cases, UE 115-e and UE 115-f may communicate in a closed loop sidelink communications environment, where the UEs 115 may use resource allocations from the base station 105-b to transmit sidelink communications to one another (e.g., using sidelink mode 1). In some cases, the process flow 300 may support the UE 115-e indicating a resource request for both UE 115-e and UE 115-f, reducing system latency otherwise associated with explicit resource request signaling from UE 115-f.

In the following description of the process flow 300, the operations may be performed (e.g., reported or provided) in a different order than the order shown, or the operations performed by the UEs 115 and the base station 105-b may be performed in different orders or at different times. For example, specific operations also may be left out of the process flow 300, or other operations may be added to the process flow 300. Further, although some operations or signaling may be shown to occur at different times for discussion purposes, these operations may actually occur at the same time.

At 305, the UE 115-e may identify data, for example, data to be transmitted to the UE 115-f. For example, the UE 115-e may communicate with the UE 115-f using sidelink communications, where the UE 115-e may identify data to transmit to the UE 115-f over a sidelink communication link. In some examples, identifying the data to be transmitted to the UE 115-f may involve detecting that a closed loop sidelink communication may be performed at the access stratum of UE 115-e. For example, the UE 115-e may decide to transmit a sidelink CSI report request to the UE 115-f, where the sidelink CSI report request may trigger the UE 115-f to perform a closed loop sidelink communication and transmit a sidelink CSI report back to the UE 115-e. In another example, the UE 115-e may decide to perform a PC5 RRC reconfiguration procedure where the UE 115-e may transmit RRCReconfigurationSidelink to the UE 115-f. As such, the UE 115-f may perform a closed loop sidelink communication and may transmit RRCReconfiguration-CompleteSidelink to the UE 115-e. In yet another example, the UE 115-e may receive an indication from upper layer(s) (e.g., NAS layer, application layer) together with the upper-layer-generated data, where the indication indicates the generated data will trigger a closed loop sidelink communication with the UE 115-f.

At 310, the UE 115-e may select a configuration for a message. For example, the UE 115-e may select a configuration for the message from a set of configurations based at least in part on the configuration identifying that the message requests allocations of sidelink resources for both UEs 115 of a sidelink. In other words, the selected configuration may indicate a request for resource allocations for both UE 115-e and UE 115-f. In some examples, the selected configuration for the message includes one of a set of random access channel (RACH) preambles, a sidelink SR configuration, a destination identifier of a buffer status report (BSR), or a logical common group (LCG) identifier of the BSR. In some examples, the one or more configurations may be provisioned to the UE 115-e from the base station 105-b (e.g., the base station 105-b may configure the UE 115-e with the special configurations), predefined at the UE 115-e, among other examples.

At 315, the UE 115-e may transmit, to a network entity, a message requesting both an allocation of sidelink resources for the UE 115-e to use to transmit to the UE 115-f on a sidelink and an allocation of sidelink resources for the UE 115-f to use to transmit to the UE 115-e on the sidelink. For example, the UE 115-e may transmit, and the base station 105-b may receive, a resource allocation request. In such examples, the UE 115-e and the UE 115-f may communicate in accordance with sidelink mode 1, where the base station 105-b may control access to sidelink communication links. In some examples, the UE 115-*e* may transmit the resource allocation request for the closed loop sidelink communication between UE 115-*e* and the UE 115-*f*, where the resource allocation request may indicate a request for a resource allocation associated with transmissions from UE 115-*e* to UE 115-*f* and a request for a resource allocation associated with transmissions from UE 115-*f* to UE 115-*e*. In some examples, the UE 115-*e* may transmit, according to the selected configuration at 310, the message requesting both the allocation of sidelink resources for the UE 115-*e* and the allocation of sidelink resources for the UE 115-*f*.

In some examples, the UE 115-*e* may indicate, within the resource allocation request, an estimated size range, a latency threshold, or both, associated with a feedback message from the UE 115-*f*. In some cases, the UE 115-*e* may transmit, in the message requesting both the allocation of sidelink resources for the UE 115-*e* and the allocation of sidelink resources for the UE 115-*f*, an indication of a size range, latency requirement, or both, for an indication of the first set of sidelink resources for the UE 115-*e*. For example, the UE 115-*e* may implicitly indicate different size range(s), latency thresholds, or both, with different random access configurations, SR configurations, and BSR configurations. In another example, the UE 115-*e* may explicitly indicate size range with a sidelink BSR. To support indicating the size range of the feedback message from the UE 115-*f*, the UE 115-*e* may estimate the size range of the feedback message or may receive an estimation of the size range. For example, the UE 115-*e* may determine, or otherwise estimate, a size (e.g., a maximal size) of a sidelink CSI MAC-CE to be received from the UE 115-*f* and may indicate the size of the sidelink CSI MAC-CE within the resource allocation request. In another example, the UE 115-*e* may determine, or otherwise estimate, a size (e.g., a maximal size) of a PC5 RRC reconfiguration message (e.g., RRCReconfigurationFailureSidelink, RRCReconfigurationCompleteSidelink) from the UE 115-*f*. In yet another example, the UE 115-*e* may receive an estimation from an upper layer indicating a size of a response message from the UE 115-*f* based on the message to be transmitted to the UE 115-*f*. That is, the UE 115-*e* may receive a message from an upper layer (e.g., from the base station 105-*b* or the UE 115-*f*) of a feedback message size estimation based on one or more data messages transmitted from UE 115-*e* to UE 115-*f*.

In some examples, the UE 115-*e* may be triggered to transmit the resource allocation request. That is, the techniques as described herein (e.g., the proposed scheme) for closed loop sidelink communication may be triggered at the UE 115-*e* based on one or more triggers. For example, UE 115-*e* may detect a large latency between a first and a second sidelink transmission from a previous closed loop sidelink communication, triggering the UE 115-*e* to transmit the resource allocation request including both a request for sidelink resource allocation at the UE 115-*e* and a request for sidelink resource allocation at the UE 115-*f*. In another example, the UE 115-*e* may be triggered to transmit the resource allocation request in response to detecting, or receiving, a sidelink transmission from the UE 115-*f* in an NTN-controlled sidelink mode 1 resource pool. That is, receiving a transmission from UE 115-*f* on a resource in an NTN-controlled sidelink mode 1 resource pool may trigger the UE 115-*e* to transmit the resource allocation request to the base station 105-*b*. In yet another example, the UE 115-*f* may indicate a serving cell ID, a public land mobile network (PLMN) ID, or both, to the UE 115-*e* (e.g., via PC5 RRC signaling), where the indicated serving cell ID or the PLMN ID may be an NTN cell or an NTN PLMN, respectively. Receiving the serving cell ID, the PLMN ID, or both, may trigger UE 115-*e* to transmit the resource allocation request. In some examples, the UE 115-*e* may transmit the resource allocation request based on a UE capability to transmit the resource allocation request. For example, the UE 115-*e* may be configured to request a sidelink resource allocation for UE 115-*e* and one or more other peer UEs 115 such as UE 115-*f*. In some cases, the UE 115-*e* may transmit a UE capability signal to the base station 105-*b*, the UE capability signal indicating that the UE 115-*e* may be able to transmit a sidelink resource allocation to the UE 115-*f*, an indication that the base station 105-*b* may directly configure UE 115-*f* with a sidelink resource, among other capability signals.

At 320, the base station 105-*b* may allocate multiple sidelink resources. In some examples, the base station 105-*b* may determine, based at least in part on the message received at 315 being configured according to a configuration from a set of configurations, that the message requests allocations of sidelink resources for both UEs 115 of a sidelink. In such examples, the selected configuration for the message may include one of a set of RACH preambles, a sidelink SR configuration, a destination identifier of a BSR, or an LCG identifier of the BSR. In some examples, the base station 105-*b* may receive the resource request for a closed loop sidelink communication between UE 115-*e* and UE 115-*f*. As such, the base station 105-*b* may allocate a first set of sidelink resources and a second set of sidelink resources, where the base station may allocate the second set of sidelink resources according to the received resource allocation request.

At 325, the base station 105-*b* may transmit, and the UE 115-*e* may receive, a first resource allocation. In other words, the UE 115-*e* may receive, from the network entity in response to the transmitted request message, an indication of a first set of sidelink resources for the UE 115-*e*. In some examples, the first resource allocation may include the first set of sidelink resources and an indication of the second set of sidelink resources. In some examples, the base station 105-*b* may indicate the second set of sidelink resources to the UE 115-*e* for the UE 115-*e* to indicate the second set of sidelink resources to the UE 115-*f*. Specifics associated with the UE 115-*e* indicating the second set of sidelink resources to the UE 115-*f* are described in more detail with reference to FIG. 4. In some examples, the base station 105-*b* may indicate to the UE 115-*e* that the base station 105-*b* may transmit a second resource allocation directly to the UE 115-*f*. Specifics associated with the base station transmitting the second resource allocation directly to the UE 115-*f* are described in more detail with reference to FIG. 5.

At 330, the UE 115-*e* may transmit one or more data messages to the UE 115-*f*, on the first set of sidelink resources. In some examples, the UE 115-*e* may transmit the data transmission including information identified at 305 using the first set of sidelink resources.

In some cases, at 335, the UE 115-*e* may transmit, and the UE 115-*f* may receive a second resource indication. In some examples, the UE 115-*f* may receive the second resource indication exclusive of a request by the UE 115-*f* to the network entity (e.g., the base station 105-*b*) for an allocation of sidelink resources for the UE 115-*f*. In some examples, the second resource indication may include an explicit indication of the second set of sidelink resources, for example, in cases where the base station 105-*b* indicates the second set of sidelink resources to the UE 115-*e* for the UE 115-*e* to indicate the second set of sidelink resources to the UE 115-*f* In some examples, the second resource indication may inform the UE 115-f that the base station 105-b may transmit an allocation message to the UE 115-f configuring the UE 115-f with the second set of sidelink resources, for example, in cases where the base station 105-b indicates to the UE 115-e that the base station 105-b may transmit a second resource allocation directly to the UE 115-f. In some cases, the UE 115-e may transmit the second resource indication as or within the data messages transmitted at 330.

At 340, the UE 115-f may process data, such as data received from the UE 115-e at 330 and, in some cases, at 335. In some examples, the UE 115-f may identify that the data transmission received at 330 may trigger a response message from the UE 115-f. As such, the UE 115-f may generate data to be transmitted to UE 115-e, for example, as or within a response (e.g., feedback) message. Additionally, the UE 115-f may identify the second set of sidelink resources or the UE 115-f may identify that the base station 105-b may allocate the second set of sidelink resources based on receiving the second resource indication at 335.

In some cases, at 340, the UE 115-f may monitor for a second resource allocation, for example, in cases where the base station 105-b may transmit an allocation message to the UE 115-f configuring the UE 115-f with the second set of sidelink resources. In such cases, at 345, the base station 105-b may transmit, and the UE 115-f may receive the second resource allocation, enabling the UE 115-f to transmit messages to the UE 115-e using the second set of sidelink resources.

At 350, the UE 115-f may transmit, and the UE 115-e may receive one or more data messages on the second set of sidelink resources, for example, including a response message. In some examples, the response message may include the data generated at 340, for example, in response to receiving the data transmission at 330.

Figure 4:
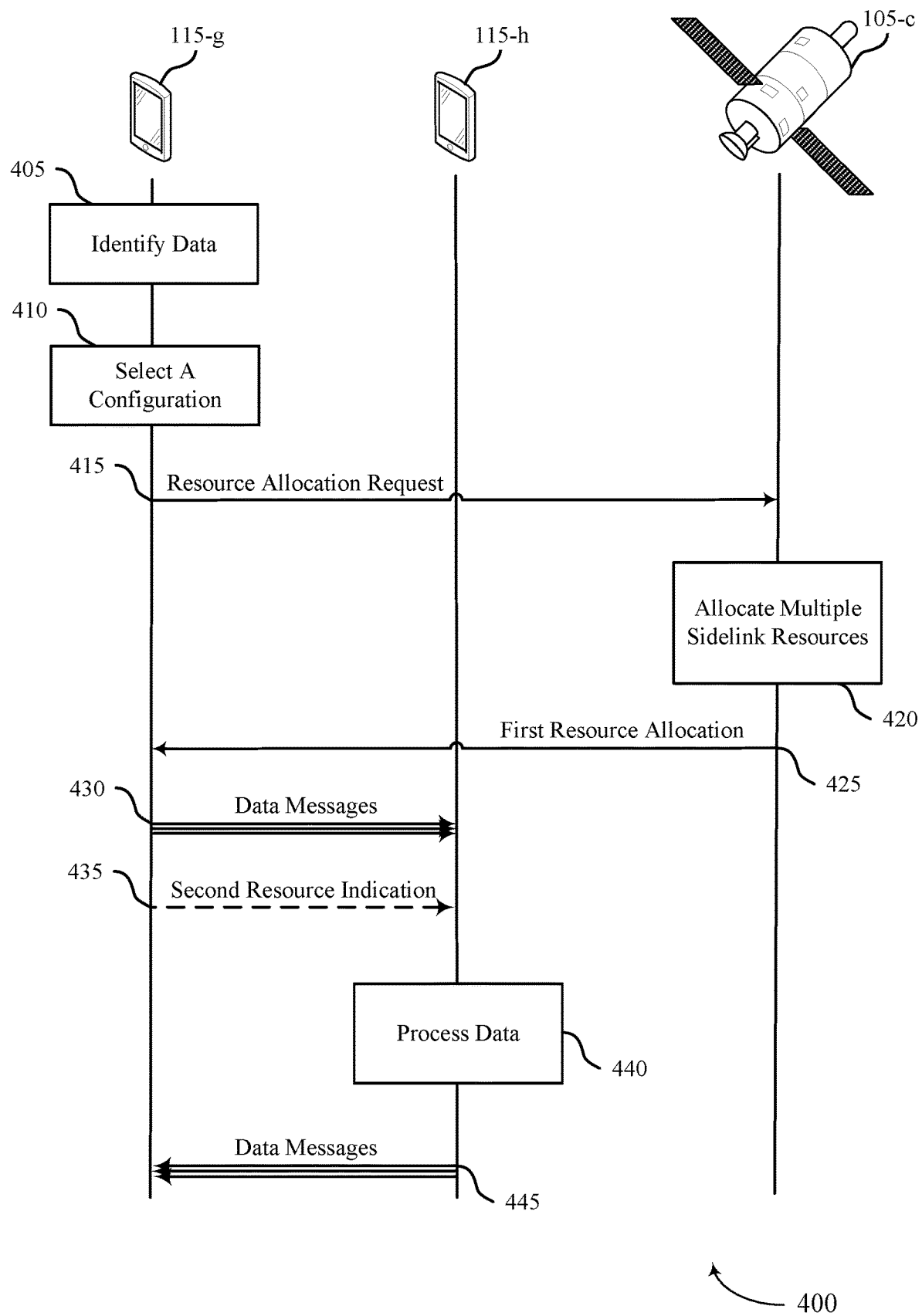

FIG. 4 illustrates an example of a process flow 400 that supports reducing latency for closed loop sidelink communications for non-terrestrial networks in accordance with aspects of the present disclosure. In some examples, the process flow 400 may implement aspects of wireless communications systems 100 or 200. For example, process flow 400 may include UE 115-g, UE 115-h, and base station 105-c, which may be examples of corresponding devices as described with reference to FIGS. 1 through 3. In some cases, UE 115-g and UE 115-h may communicate in a closed loop sidelink communications environment, where the UEs 115 may use resource allocations from the base station 105-c to transmit sidelink communications to one another (e.g., using sidelink mode 1). In some cases, the process flow 400 may support the UE 115-g indicating a resource request for both UE 115-g and UE 115-h, reducing system latency otherwise associated with explicit resource request signaling from UE 115-h.

In the following description of the process flow 400, the operations may be performed (e.g., reported or provided) in a different order than the order shown, or the operations performed by the UEs 115 and the base station 105-c may be performed in different orders or at different times. For example, specific operations also may be left out of the process flow 400, or other operations may be added to the process flow 400. Further, although some operations or signaling may be shown to occur at different times for discussion purposes, these operations may actually occur at the same time.

At 405, the UE 115-g may identify data, for example, data to be transmitted to the UE 115-h. For example, the UE 115-g may communicate with the UE 115-h using sidelink communications, where the UE 115-g may identify data to transmit to the UE 115-h over a sidelink communication link.

At 410, the UE 115-g may select a configuration for a message. For example, the UE 115-g may select a configuration for the message from a set of configurations based at least in part on the configuration identifying that the message requests allocations of sidelink resources for both UEs 115 of a sidelink. In other words, the selected configuration may indicate a request for resource allocations for both UE 115-g and UE 115-h. In some examples, the selected configuration for the message includes one of a set of RACH preambles, a sidelink SR configuration, a destination identifier of a BSR, or an LCG identifier of the BSR. In some examples, the one or more configurations may be provisioned to the UE 115-g from the base station 105-c (e.g., the base station 105-c may configure the UE 115-g with the special configurations), predefined at the UE 115-g, among other examples.

At 415, the UE 115-g may transmit, to a network entity, a message requesting both an allocation of sidelink resources for the UE 115-g to use to transmit to the UE 115-h on a sidelink and an allocation of sidelink resources for the UE 115-h to use to transmit to the UE 115-g on the sidelink. For example, the UE 115-g may transmit, and the base station 105-c may receive, a resource allocation request, such as the resource allocation request at 315 as described with reference to FIG. 3. For example, the resource request may indicate a request for a resource allocation associated with transmissions from UE 115-g to UE 115-h and a request for a resource allocation associated with transmissions from UE 115-h to UE 115-g. In some examples, the UE 115-g may transmit the resource allocation request in accordance with one or more configurations selected at 410. Further, the UE 115-g may transmit the resource allocation request including an indication of a size range, a latency requirement, or both, for an indication of the first set of sidelink resources for the UE 115-g.

At 420, the base station 105-c may allocate multiple sidelink resources. In some examples, the base station 105-b may determine, based at least in part on the message received at 415 being configured according to a configuration from a set of configurations, that the message requests allocations of sidelink resources for both UEs 115 of a sidelink. In such examples, the selected configuration for the message may include one of a set of RACH preambles, a sidelink SR configuration, a destination identifier of a BSR, or an LCG identifier of the BSR. In some examples, the base station 105-b may receive the resource allocation request for a closed loop sidelink communication between UE 115-e and UE 115-f. As such, the base station 105-c may allocate a first set of sidelink resources and a second set of sidelink resources, where the base station 105-c may allocate the second set of sidelink resources according to the received resource allocation request.

At 425, the base station 105-c may transmit a first resource allocation to the UE 115-g, where the first resource allocation may include the first set of sidelink resources and the second set of sidelink resources such that the UE 115-g may forward the second set of sidelink resources to the UE 115-h, for example, over the first set of sidelink resources. As such, the UE 115-g may receive the first resource allocation including the first set of sidelink resources and the second set of sidelink resources, the second set of sidelink resources assigned for use by the UE 115-h. In other words, the UE 115-g may receive, from the network entity, a message including the indication of the first set of sidelink resources for the UE 115-g and an indication of the second set of sidelink resource for the UE 115-h.

At 430, the UE 115-g may transmit one or more data messages to the UE 115-h. For example, the UE 115-g may transmit the data identified at 405 to the UE 115-h via a first sidelink transmission over the first set of sidelink resources.

At 435, the UE 115-g may transmit, and the UE 115-h may receive, a second resource indication. In other words, the UE 115-g may transmit, to the UE 115-h, a message identifying the second set of sidelink resources for the UE 115-h. In some examples, the second resource indication may include an explicit indication of the second set of sidelink resources. In some examples, the UE 115-g may transmit the second resource indication within one or more data messages at 430. That is, in some cases, at least one of the one or more data messages transmitted to the UE 115-h on the first set of sidelink resources include the message identifying the second set of sidelink resources for the UE 115-h. In other examples, the UE 115-g may transmit the second resource indication within a message different from the data transmission at 430, in some cases, using a third set of sidelink resources configured by the base station 105-c.

At 440, the UE 115-h may process data such as data received from the UE 115-g at 430 and at 435. In some examples, the UE 115-h may identify that the data transmission received at 430 may trigger a response message from the UE 115-h. As such, the UE 115-h may generate data to be transmitted to UE 115-g, for example, corresponding to the first sidelink transmission received from the UE 115-g. Additionally, the UE 115-h may identify the second set of sidelink resources based on receiving the second resource indication at 335.

At 445, the UE 115-h may transmit, and the UE 115-g may receive, one or more data messages on the second set of sidelink resources, for example, including a response message. In some examples, the response message may include the data generated at 340, for example, in response to receiving the data transmission at 330.

Figure 5:
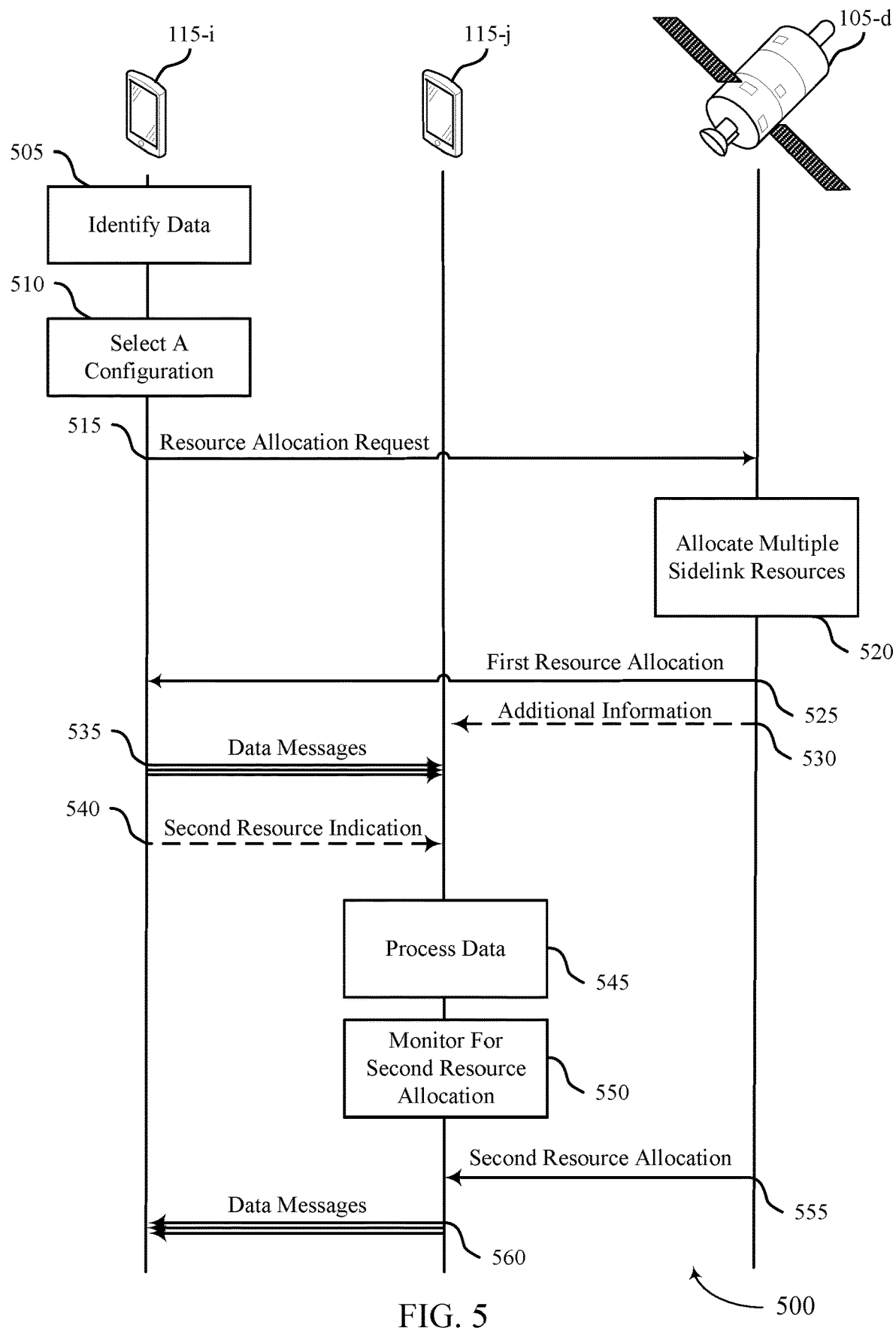

FIG. 5 illustrates an example of a process flow 500 that supports reducing latency for closed loop sidelink communications for non-terrestrial networks in accordance with aspects of the present disclosure. In some examples, the process flow 500 may implement aspects of wireless communications systems 100 or 200. For example, process flow 500 may include UE 115-i, UE 115-j, and base station 105-d, which may be examples of corresponding devices as described with reference to FIGS. 1 through 4. In some cases, UE 115-i and UE 115-j may communicate in a closed loop sidelink communications environment, where the UEs 115 may use resource allocations from the base station 105-d to transmit sidelink communications to one another (e.g., using sidelink mode 1). In some cases, the process flow 500 may support the UE 115-i indicating a resource request for both UE 115-i and UE 115-j, reducing system latency otherwise associated with explicit resource request signaling from UE 115-j.

In the following description of the process flow 500, the operations may be performed (e.g., reported or provided) in a different order than the order shown, or the operations performed by the UEs 115 and the base station 105-d may be performed in different orders or at different times. For example, specific operations also may be left out of the process flow 500, or other operations may be added to the process flow 500. Further, although some operations or signaling may be shown to occur at different times for discussion purposes, these operations may actually occur at the same time.

At 505, the UE 115-i may identify data, for example, data to be transmitted to the UE 115-j. For example, the UE 115-i may communicate with the UE 115-j using sidelink communications, where the UE 115-i may identify data to transmit to the UE 115-j over a sidelink communication link.

At 510, the UE 115-i may select a configuration for a message. For example, the UE 115-i may select a configuration for the message from a set of configurations based at least in part on the configuration identifying that the message requests allocations of sidelink resources for both UEs 115 of a sidelink. In other words, the selected configuration may indicate a request for resource allocations for both UE 115-i and UE 115-j. In some examples, the selected configuration for the message includes one of a set of RACH preambles, a sidelink SR configuration, a destination identifier of a BSR, or an LCG identifier of the BSR. In some examples, the one or more configurations may be provisioned to the UE 115-i from the base station 105-d (e.g., the base station 105-d may configure the UE 115-i with the special configurations), predefined at the UE 115-i, among other examples.

At 515, the UE 115-i may transmit, to a network entity, a message requesting both an allocation of sidelink resources for the UE 115-i to use to transmit to the UE 115-j on a sidelink and an allocation of sidelink resources for the UE 115-j to use to transmit to the UE 115-i on the sidelink. For example, the UE 115-i may transmit, and the base station 105-d may receive, a resource allocation request, such as the resource allocation request at 315 as described with reference to FIG. 3. For example, the resource allocation request may indicate a request for a resource allocation associated with transmissions from UE 115-i to UE 115-j and a request for a resource allocation associated with transmissions from UE 115-j to UE 115-i. In some examples, the UE 115-i may transmit the resource allocation request according to one or more configurations selected at 510. Further, the UE 115-g may transmit the resource allocation request including an indication of a size range, a latency requirement, or both, for an indication of the first set of sidelink resources for the UE 115-g.

At 520, the base station 105-d may allocate multiple sidelink resources. In some examples, the base station 105-d may determine, based at least in part on the message received at 515 being configured according to a configuration from a set of configurations, that the message requests allocations of sidelink resources for both UEs 115 of a sidelink. In such examples, the selected configuration for the message may include one of a set of RACH preambles, a sidelink SR configuration, a destination identifier of a BSR, or an LCG identifier of the BSR. In some examples, the base station 105-d may receive the resource allocation request for a closed loop sidelink communication between UE 115-i and UE 115-j. As such, the base station 105-d may allocate a first set of sidelink resources and a second set of sidelink resources, where the base station 105-d may allocate the second set of sidelink resources according to the received resource allocation request.

At 525, the base station 105-d may transmit a first resource allocation to the UE 115-i, where the resource allocation may include the first set of sidelink resources. In some examples, the base station 105-d may transmit to the UE 115-i in response to the received request, a first message that includes an indication of the first set of sidelink resources for the UE 115-i. Additionally, the base station 105-d may indicate in the first resource allocation that the base station 105-d may directly transmit a resource allocation to the UE 115-j. In some examples, the base station 105-*d* may transmit additional information to the UE 115-*i* together with the first set of sidelink resources, where the additional information may be used by UE 115-*j* to receive a second set of sidelink resource allocation directly from the base station 105-*d*.

Additionally or alternatively, in some cases, at 530, the base station 105-*d* may directly configure the UE 115-*j* with the additional information, for example, via dedicated signaling to the UE 115-*j*. Or, in some cases, the additional information may be known to the UE 115-*j*, for example, the additional information may be preconfigured at the UE 115-*j* (e.g., defined in a specification).

In some examples, the UE 115-*i* may receive the first resource allocation at 525. In some cases, the first resource allocation may indicate if a second set of sidelink resources may be allocated or sent to UE 115-*j* directly. In cases where the second set of sidelink resources may not be allocated or sent to the UE 115-*j* directly, the UE 115-*i* and the UE 115-*j* may fall back to a baseline scheme (e.g., where UE 115-*j* may request the second set of sidelink resources from the base station 105-*d* directly). In some cases, the resource allocation may indicate additional information used by the UE 115-*j* to receive the second set of sidelink resource allocation from the base station 105-*d*. For example, the additional information may include a dedicated radio network temporary identifier (RNTI), a time resource, a frequency resource, or a combination thereof, that the base station 105-*d* may use or otherwise reference for transmitting the second sidelink resource allocation directly to the UE 115-*j*.

At 535, the UE 115-*i* may transmit one or more data messages to the UE 115-*j*. For example, the UE 115-*i* may transmit the data identified at 505 to the UE 115-*j* via a first sidelink transmission over the first set of sidelink resources.

In some cases, at 540, the UE 115-*i* may transmit a second resource indication to the UE 115-*j*, the second resource indication indicating that a sidelink resource may be sent to the UE 115-*j* directly by the base station 105-*d*. In other words, the UE 115-*i*, to the UE 115-*j* at least in part in response to the received indication of the first set of sidelink resources for the UE 115-*i*, a message indicating that the network entity (e.g., the base station 105-*d*) will transmit to the UE 115-*j* a message identifying the second set of sidelink resources for the UE 115-*j*. In some cases, the UE 115-*i* may transmit, in the message indicating that the network entity will transmit the second set of sidelink resources, an indication of an RNTI, a time resource, a frequency resource, or any combination thereof, that the network entity will use to transmit the message identifying the second set of sidelink resources. In some examples, before receiving the one or more data messages from the UE 115-*i*, a preconfigured set of resources for the UE 115-*j* to use to receive the allocation of sidelink resource from the network entity. In some cases, the UE 115-*i* may transmit the second resource indication via the first sidelink transmission. For example, the UE 115-*i* may transmit the second resource indication within the one or more data messages at 535. In some cases, the UE 115-*i* may transmit the second resource indication as one bit in sidelink control information (SCI), a MAC-CE, among other messages transmitted to UE 115-*j*. In some cases, the UE 115-*i* may transmit the second resource indication after receiving the indication from the base station 105-*d* that the second sidelink resource allocation may be allocated or sent to the UE 115-*j* directly, for example, in a message different from the one or more data messages at 535.

The UE 115-*j* may receive the first sidelink transmission from the UE 115-*i*, where the first sidelink transmission may indicate that a second set of sidelink resources may be allocated or sent directly by the base station 105-*d* to the UE 115-*j*. In some cases, the first sidelink transmission may further indicate information used by the UE 115-*j* to receive the second sidelink resource allocation.

At 545, the UE 115-*j* may process data such as data received from the UE 115-*i* at 535 and at 540. In some examples, the UE 115-*j* may identify that the data transmission received at 535 may trigger a response message from the UE 115-*j*. As such, the UE 115-*j* may generate data to be transmitted to UE 115-*e*, for example, corresponding to the first sidelink transmission received from the UE 115-*g*. Additionally, the UE 115-*h* may identify the second set of sidelink resources based on receiving the second resource indication at 330.

At 550, the UE 115-*j* may monitor for the second sidelink resource allocation from the base station 105-*d* in accordance with receiving the first sidelink transmission from the UE 115-*i*. Additionally, in some examples, the UE 115-*j* may monitor for the second sidelink resource allocation, referencing additional information (e.g., received from the UE 115-*i*, preconfigured at the UE 115-*j*) to receive the second sidelink resource allocation from the base station 105-*d*. For example, UE 115-*j* may monitor for the second resource allocation based on a dedicated radio network temporary identifier (RNTI), a time resource, a frequency resource, or a combination thereof, that the base station 105-*d* may use or otherwise reference for transmitting the second sidelink resource allocation directly to the UE 115-*j*.

At 555, the base station 105-*d* may transmit, and the UE 115-*j* may receive, the second resource allocation. That is, the UE 115-*j* may receive the second sidelink resources, for example, to transmit information to the UE 115-*i*. In some examples, the UE 115-*j* may receive the indication of the second set of sidelink resources (e.g., the second resource allocation) from the network entity according to the preconfigured set of resources.

At 560, the UE 115-*j* may transmit, and the UE 115-*i* may receive, one or more data messages, for example, including a response message on the second set of sidelink resources. In some examples, the response message may include the data generated at 545, for example, in response to receiving the data transmission at 535.

Figure 6:
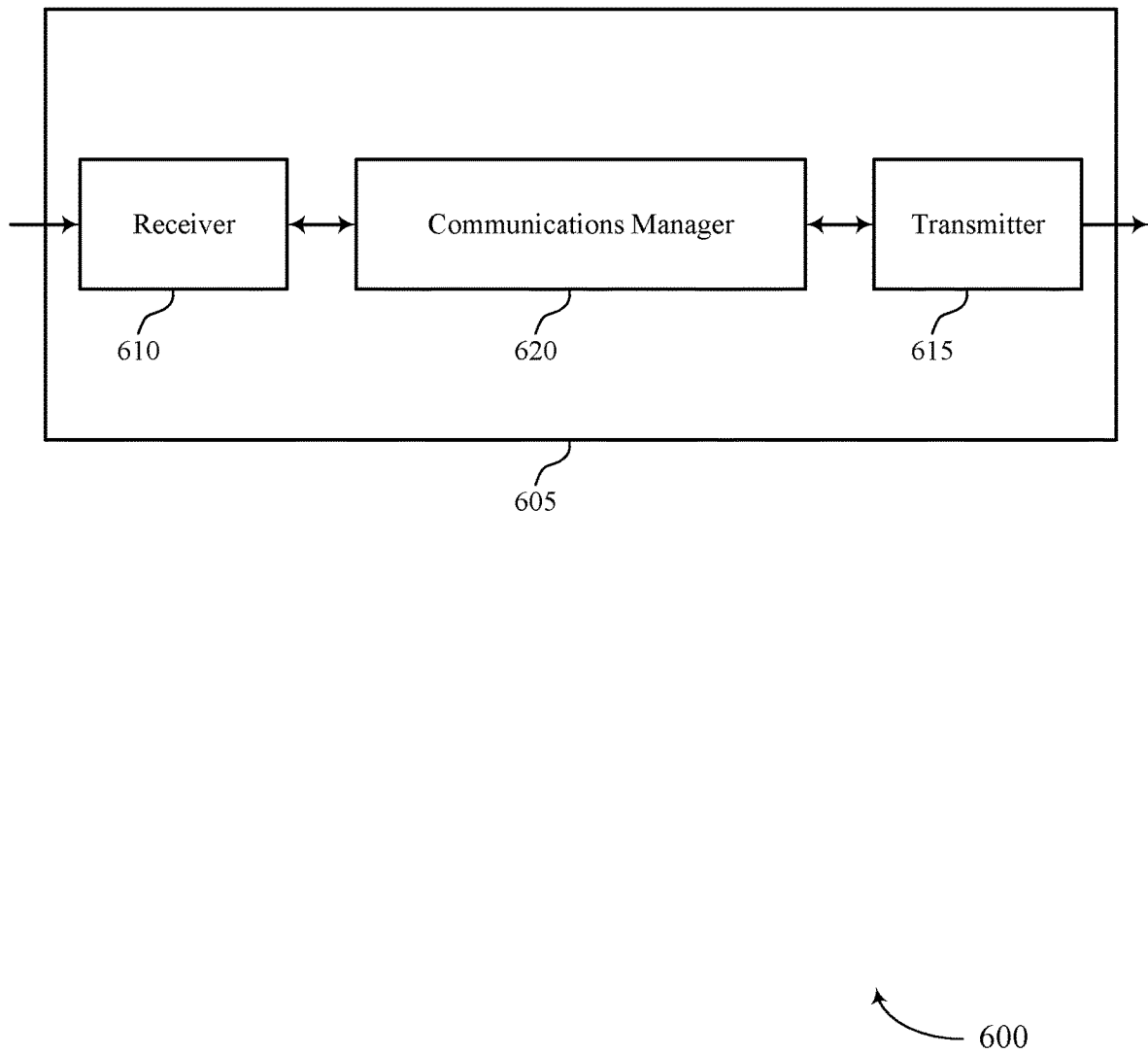
FIGS. 6 and 7 show block diagrams of devices that support reducing latency for closed loop sidelink communications for NTNs in accordance with aspects of the present disclosure.

FIG. 6 shows a block diagram 600 of a device 605 that supports reducing latency for closed loop sidelink communications for non-terrestrial networks in accordance with aspects of the present disclosure. The device 605 may be an example of aspects of a wireless device as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to reducing latency for closed loop sidelink communications for non-terrestrial networks). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to reducing latency for closed loop sidelink communications for non-terrestrial networks). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of reducing latency for closed loop sidelink communications for non-terrestrial networks as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an ASIC, an field programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first wireless device in accordance with examples as disclosed herein. For example, the communications manager 620 may be configured as or otherwise support a means for transmitting a message requesting both an allocation of sidelink resources for the first wireless device to use to transmit to at least a second wireless device on a sidelink and an allocation of sidelink resources for at least the second wireless device to use to transmit to at least the first wireless device on the sidelink. The communications manager 620 may be configured as or otherwise support a means for receiving, in response to the transmitted request message, an indication of a first set of sidelink resources for the first wireless device. The communications manager 620 may be configured as or otherwise support a means for transmitting one or more messages to at least the second wireless device on the first set of sidelink resources. The communications manager 620 may be configured as or otherwise support a means for receiving one or more messages from at least the second wireless device on a second set of sidelink resources.

Additionally or alternatively, the communications manager 620 may support wireless communication at a second wireless device in accordance with examples as disclosed herein. For example, the communications manager 620 may be configured as or otherwise support a means for receiving one or more messages from a first wireless device on a first set of sidelink resources of a sidelink. The communications manager 620 may be configured as or otherwise support a means for receiving, exclusive of a request by the second wireless device to a network entity for an allocation of sidelink resources for the second wireless device, an indication of a second set of sidelink resources for the second wireless device to use to transmit to at least the first wireless device on the sidelink in response to the one or more messages from the first wireless device. The communications manager 620 may be configured as or otherwise support a means for transmitting one or more messages to the first wireless device on the second set of sidelink resources.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for mitigating explicit resource allocation request signaling from the second wireless device, reducing signaling overhead, resulting in reduced processing, less power consumption, reduced system latency, among other examples.

Figure 7:
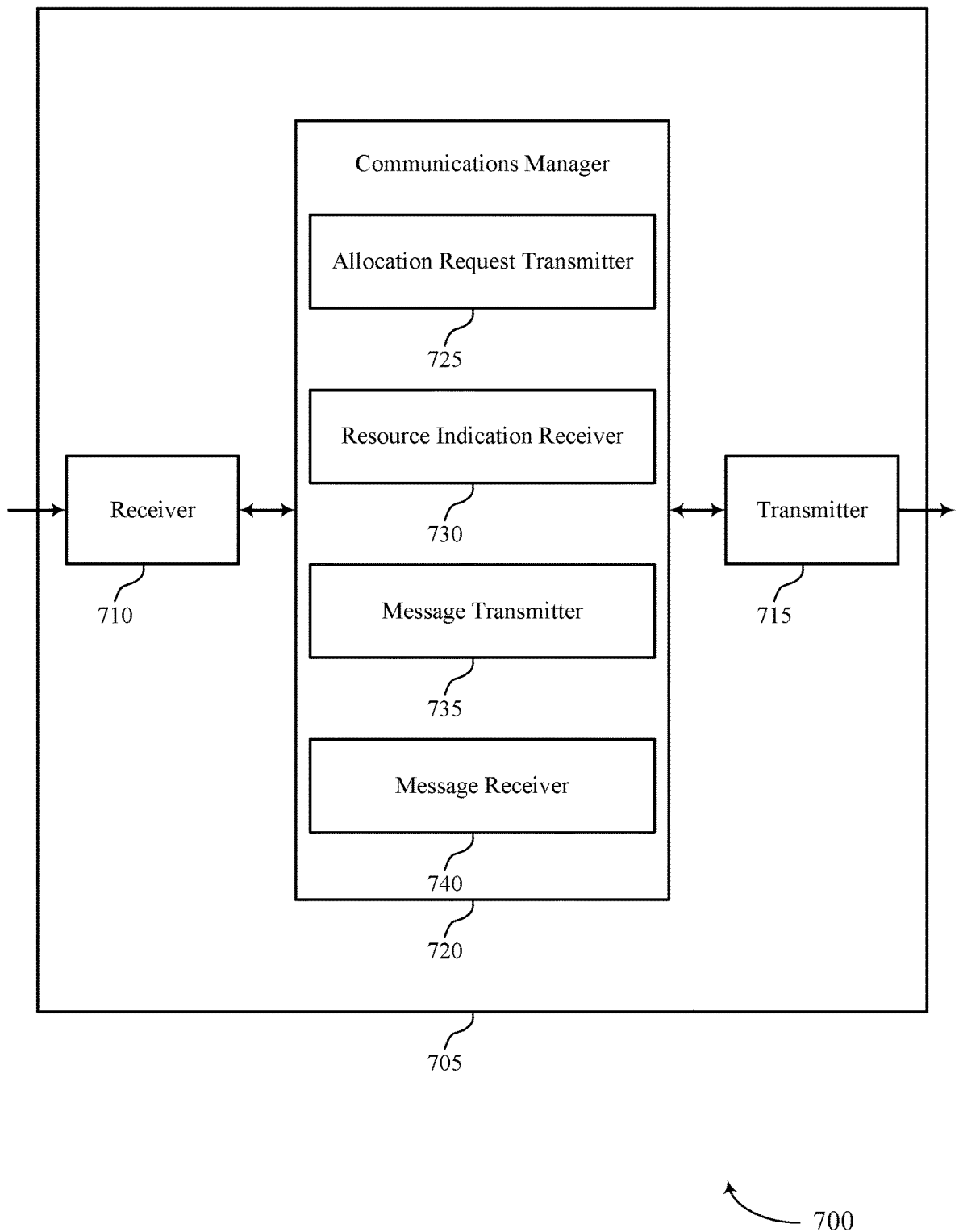

FIG. 7 shows a block diagram 700 of a device 705 that supports reducing latency for closed loop sidelink communications for non-terrestrial networks in accordance with aspects of the present disclosure. The device 705 may be an example of aspects of a device 605 or a wireless device (e.g., a UE 115) as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to reducing latency for closed loop sidelink communications for non-terrestrial networks). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to reducing latency for closed loop sidelink communications for non-terrestrial networks). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of reducing latency for closed loop sidelink communications for non-terrestrial networks as described herein. For example, the communications manager 720 may include an allocation request transmitter 725, a resource indication receiver 730, a message transmitter 735, a message receiver 740, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a first wireless device in accordance with examples as disclosed herein. The allocation request transmitter 725 may be configured as or otherwise support a means for transmitting a message requesting both an allocation of sidelink resources for the first wireless device to use to transmit to at least a second wireless device on a sidelink and an allocation of sidelink resources for at least the second wireless device to use to transmit to at least the first wireless device on the sidelink. The resource indication receiver 730 may be configured as or otherwise support a means for receiving, in response to the transmitted request message, an indication of a first set of sidelink resources for the first wireless device. The message transmitter 735 may be configured as or otherwise support a means for transmitting one or more messages to at least the second wireless device on the first set of sidelink resources. The message receiver 740 may be configured as or otherwise support a means for receiving one or more messages from at least the second wireless device on a second set of sidelink resources.

Additionally or alternatively, the communications manager 720 may support wireless communication at a second wireless device in accordance with examples as disclosed herein. The message receiver 740 may be configured as or otherwise support a means for receiving one or more messages from a first wireless device on a first set of sidelink resources of a sidelink. The resource indication receiver 730 may be configured as or otherwise support a means for receiving, exclusive of a request by the second wireless device to a network entity for an allocation of sidelink resources for the second wireless device, an indication of a second set of sidelink resources for the second wireless device to use to transmit to at least the first wireless device on the sidelink in response to the one or more messages from the first wireless device. The message transmitter 735 may be configured as or otherwise support a means for transmitting one or more messages to the first wireless device on the second set of sidelink resources.

Figure 8:
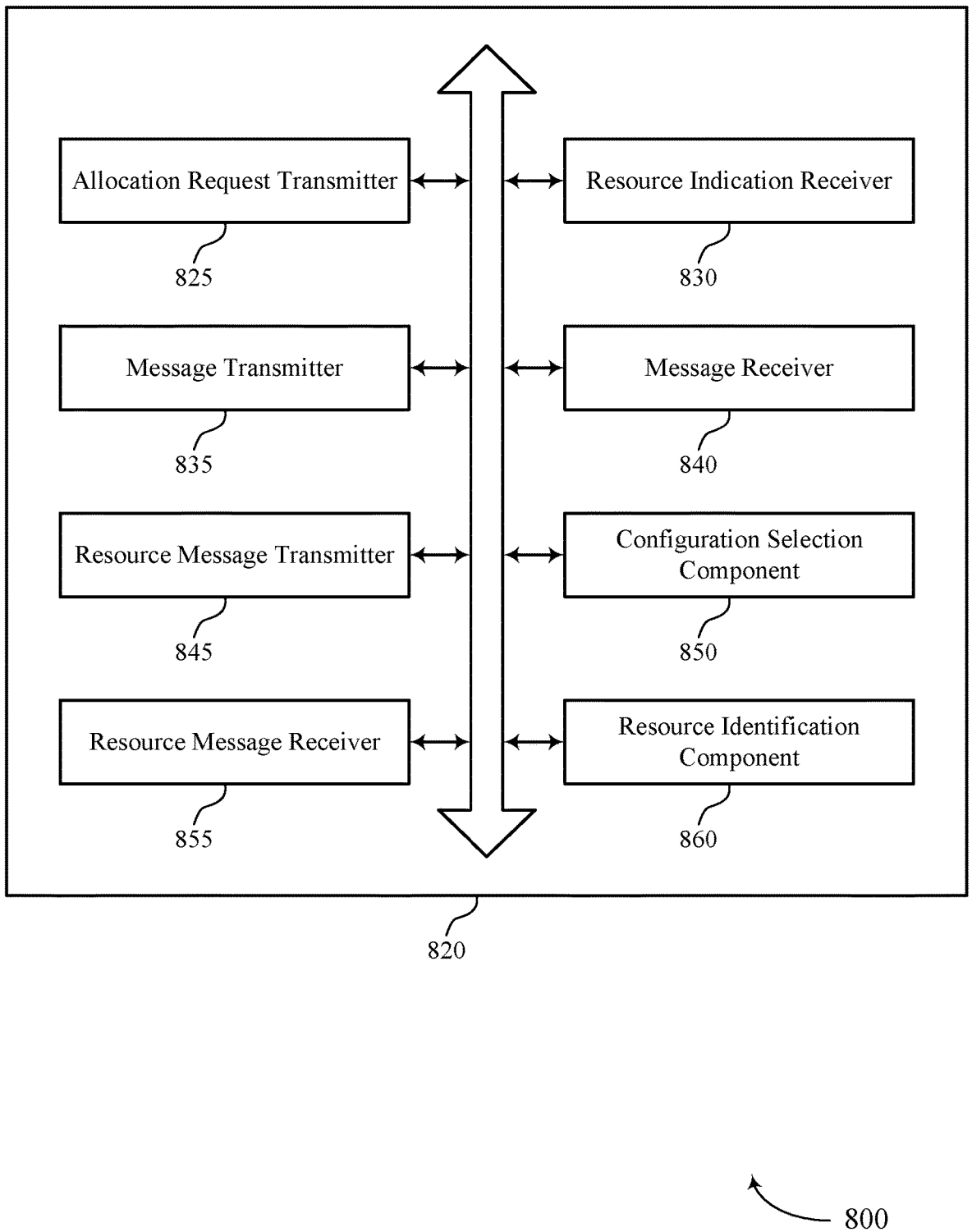
FIG. 8 shows a block diagram of a communications manager that supports reducing latency for closed loop sidelink communications for NTNs in accordance with aspects of the present disclosure.

FIG. 8 shows a block diagram 800 of a communications manager 820 that supports reducing latency for closed loop sidelink communications for non-terrestrial networks in accordance with aspects of the present disclosure. The communications manager 820 may be an example of aspects of a communications manager 620, a communications manager 720, or both, as described herein. The communications manager 820, or various components thereof, may be an example of means for performing various aspects of reducing latency for closed loop sidelink communications for non-terrestrial networks as described herein. For example, the communications manager 820 may include an allocation request transmitter 825, a resource indication receiver 830, a message transmitter 835, a message receiver 840, a resource message transmitter 845, a configuration selection component 850, a resource message receiver 855, a resource identification component 860, or any combination thereof. Each of these components may communicate, directly or indirectly, with one another (e.g., via one or more buses).

The communications manager 820 may support wireless communication at a first wireless device in accordance with examples as disclosed herein. The allocation request transmitter 825 may be configured as or otherwise support a means for transmitting a message requesting both an allocation of sidelink resources for the first wireless device to use to transmit to at least a second wireless device on a sidelink and an allocation of sidelink resources for at least the second wireless device to use to transmit to at least the first wireless device on the sidelink. The resource indication receiver 830 may be configured as or otherwise support a means for receiving, in response to the transmitted request message, an indication of a first set of sidelink resources for the first wireless device. The message transmitter 835 may be configured as or otherwise support a means for transmitting one or more messages to at least the second wireless device on the first set of sidelink resources. The message receiver 840 may be configured as or otherwise support a means for receiving one or more messages from at least the second wireless device on a second set of sidelink resources.

In some examples, the resource indication receiver 830 may be configured as or otherwise support a means for receiving an indication of the second set of sidelink resources for at least the second wireless device. In some examples, the resource message transmitter 845 may be configured as or otherwise support a means for transmitting, to at least the second wireless device, a message identifying the second set of sidelink resources for at least the second wireless device.

In some examples, at least one of the one or more messages transmitted to at least the second wireless device on the first set of sidelink resources identify the second set of sidelink resources for at least the second wireless device.

In some examples, the resource message transmitter 845 may be configured as or otherwise support a means for transmitting, to at least the second wireless device at least in part in response to the received indication of the first set of sidelink resources for the first wireless device, an indication that a network entity will transmit to at least the second wireless device a message identifying the second set of sidelink resources for at least the second wireless device.

In some examples, the resource indication receiver 830 may be configured as or otherwise support a means for receiving, from the network entity, an indication that the network entity will transmit to at least the second wireless device the message identifying the second set of sidelink resources for at least the second wireless device, wherein the indication transmitted to at least the second wireless device is transmitted in response to receiving the indication from the network entity.

In some examples, the indication that the network entity will transmit the message identifying the second set of sidelink resources is transmitted in at least one message of the one or more messages transmitted by the first wireless device to at least the second wireless device on the first set of sidelink resources.

In some examples, the resource message transmitter 845 may be configured as or otherwise support a means for transmitting, in the message indicating that the network entity will transmit the second set of sidelink resources, an indication of a radio network temporary identifier, a time resource, a frequency resource, or any combination thereof, that the network entity will use to transmit the message identifying the second set of sidelink resources.

In some examples, the resource indication receiver 830 may be configured as or otherwise support a means for receiving, from the network entity, the indication of the radio network temporary identifier, the time resource, the frequency resource, or any combination thereof.

In some examples, to support transmitting the message requesting both the allocation of sidelink resources for the first wireless device and the allocation of sidelink resources for at least the second wireless device, the configuration selection component 850 may be configured as or otherwise support a means for selecting a configuration for the message from a set of configurations based on the configuration identifying that the message requests allocations of sidelink resources for both wireless devices of the sidelink. In some examples, to support transmitting the message requesting both the allocation of sidelink resources for the first wireless device and the allocation of sidelink resources for at least the second wireless device, the allocation request transmitter 825 may be configured as or otherwise support a means for transmitting, according to the selected configuration, the message requesting both the allocation of sidelink resources for the first wireless device and the allocation of sidelink resources for at least the second wireless device.

In some examples, the selected configuration for the message includes one of a set of RACH preambles, a sidelink scheduling request configuration, a destination identifier of a BSR, or a logical channel group identifier of the BSR.

In some examples, the allocation request transmitter 825 may be configured as or otherwise support a means for transmitting, in the message requesting both the allocation of sidelink resources for the first wireless device and the allocation of sidelink resources for at least the second wireless device, an indication of a size range, latency requirement, or both, for the second set of sidelink resources for at least the second wireless device.

In some examples, the message is transmitted to a base station of a non-terrestrial network, and the response to the transmitted request message is received from the base station of the non-terrestrial network.

Additionally or alternatively, the communications manager 820 may support wireless communication at a second wireless device in accordance with examples as disclosed herein. In some examples, the message receiver 840 may be configured as or otherwise support a means for receiving one or more messages from a first wireless device on a first set of sidelink resources of a sidelink. In some examples, the resource indication receiver 830 may be configured as or otherwise support a means for receiving, exclusive of a request by the second wireless device to a network entity for an allocation of sidelink resources for the second wireless device, an indication of a second set of sidelink resources for the second wireless device to use to transmit to at least the first wireless device on the sidelink in response to the one or more messages from the first wireless device. In some examples, the message transmitter 835 may be configured as or otherwise support a means for transmitting one or more messages to the first wireless device on the second set of sidelink resources.

In some examples, the resource message receiver 855 may be configured as or otherwise support a means for receiving, from the first wireless device, an indication of the second set of sidelink resources for the second wireless device.

In some examples, at least one of the one or more messages received from the first wireless device on the first set of sidelink resources of the sidelink identify the second set of sidelink resources for the second wireless device.

In some examples, the resource message receiver 855 may be configured as or otherwise support a means for receiving, from the first wireless device, an indication that the network entity will transmit to the second wireless device a message identifying the second set of sidelink resources for the second wireless device, the indication of the second set of sidelink resources to be received from the network entity based on receiving the indication that the network entity will transmit the message identifying the second set of sidelink resources.

In some examples, the resource message receiver 855 may be configured as or otherwise support a means for receiving, from the first wireless device, an indication that the network entity will transmit to the second wireless device the message identifying the second set of sidelink resources for the second wireless device.

In some examples, the indication that the network entity will transmit the message identifying the second set of sidelink resources is received in at least one message of the one or more messages received from the first wireless device on the first set of sidelink resources.

In some examples, the resource message receiver 855 may be configured as or otherwise support a means for receiving, in the message indicating that the network entity will transmit a message identifying the second set of sidelink resources, an indication of a radio network temporary identifier, a time resource, a frequency resource, or any combination thereof, that the network entity will use to transmit the message identifying the second set of sidelink resources.

In some examples, to support receiving the indication of the second set of sidelink resources, the resource identification component 860 may be configured as or otherwise support a means for identifying, at least one of a radio network temporary identifier or a preconfigured set of resources for the second wireless device to use to receive the indication of the second set of sidelink resources from the network entity. In some examples, to support receiving the indication of the second set of sidelink resources, the resource indication receiver 830 may be configured as or otherwise support a means for receiving the indication of the second set of sidelink resources from the network entity according to the at least one of the radio network temporary identifier or the preconfigured set of resources. In some examples, the network entity includes a base station of a non-terrestrial network.

Figure 9:
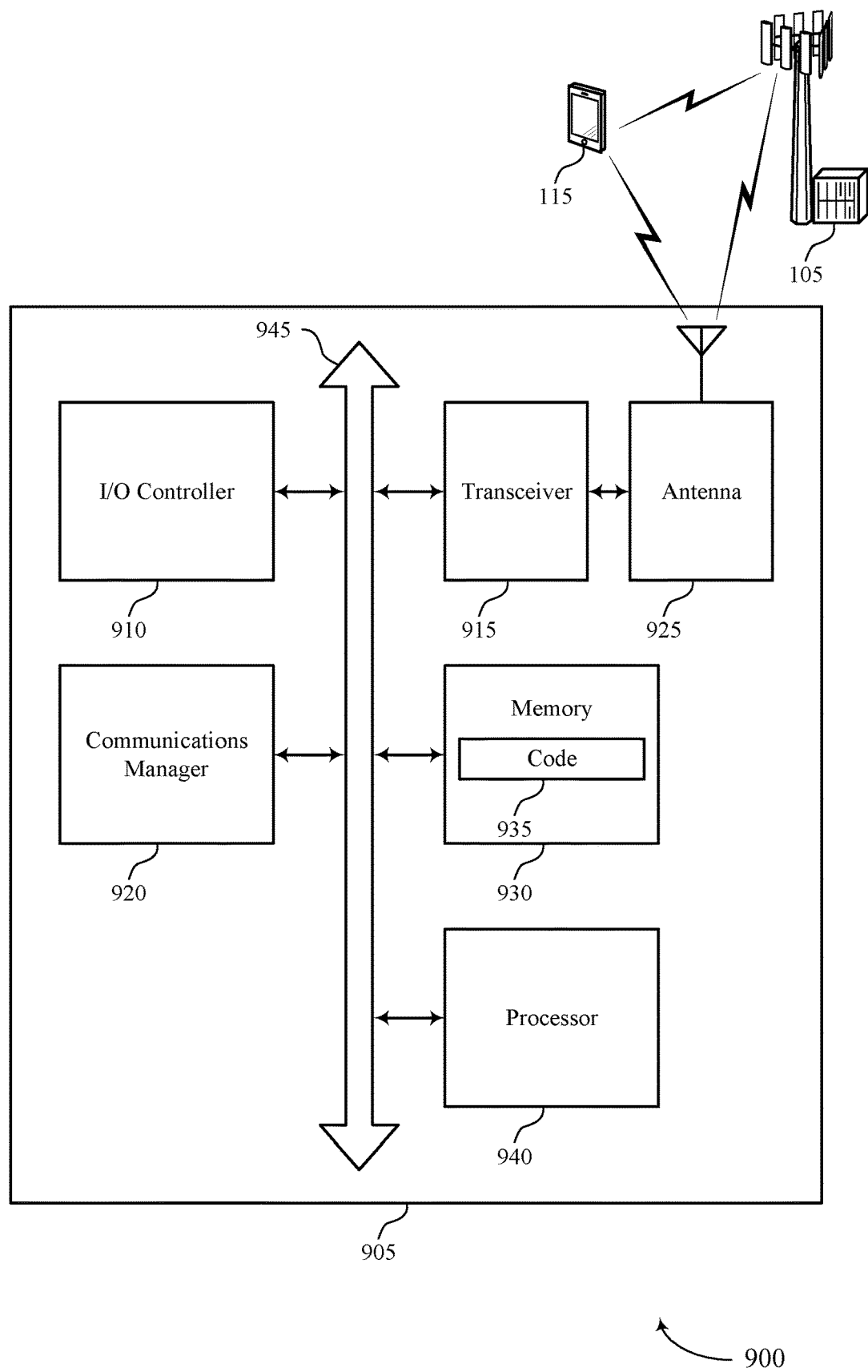
FIG. 9 shows a diagram of a system including a device that supports reducing latency for closed loop sidelink communications for NTNs in accordance with aspects of the present disclosure.

FIG. 9 shows a diagram of a system 900 including a device 905 that supports reducing latency for closed loop sidelink communications for non-terrestrial networks in accordance with aspects of the present disclosure. The device 905 may be an example of or include the components of a device 605, a device 705, or a wireless device as described herein. The device 905 may include components for bi-directional voice and data communications including components for transmitting and receiving communications, such as a communications manager 920, an I/O controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic input/output system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting reducing latency for closed loop sidelink communications for non-terrestrial networks). For example, the device 905 or a component of the device 905 may include a processor 940 and memory 930 coupled to the processor 940, the processor 940 and memory 930 configured to perform various functions described herein.

The communications manager 920 may support wireless communication at a first wireless device in accordance with examples as disclosed herein. For example, the communications manager 920 may be configured as or otherwise support a means for transmitting a message requesting both an allocation of sidelink resources for the first wireless device to use to transmit to at least a second wireless device on a sidelink and an allocation of sidelink resources for at least the second wireless device to use to transmit to at least the first wireless device on the sidelink. The communications manager 920 may be configured as or otherwise support a means for receiving, in response to the transmitted request message, an indication of a first set of sidelink resources for the first wireless device. The communications manager 920 may be configured as or otherwise support a means for transmitting one or more messages to at least the second wireless device on the first set of sidelink resources. The communications manager 920 may be configured as or otherwise support a means for receiving one or more messages from at least the second wireless device on a second set of sidelink resources.

Additionally or alternatively, the communications manager 920 may support wireless communication at a second wireless device in accordance with examples as disclosed herein. For example, the communications manager 920 may be configured as or otherwise support a means for receiving one or more messages from a first wireless device on a first set of sidelink resources of a sidelink. The communications manager 920 may be configured as or otherwise support a means for receiving, exclusive of a request by the second wireless device to a network entity for an allocation of sidelink resources for the second wireless device, an indication of a second set of sidelink resources for the second wireless device to use to transmit to at least the first wireless device on the sidelink in response to the one or more messages from the first wireless device. The communications manager 920 may be configured as or otherwise support a means for transmitting one or more messages to the first wireless device on the second set of sidelink resources.

By including or configuring the communications manager 920 in accordance with examples as described herein, the device 905 may support techniques for mitigating explicit resource allocation request signaling from the second wireless device, reducing signaling overhead, reduced power consumption, more efficient utilization of communication resources, improved coordination between devices, longer battery life, and improved utilization of processing capability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of reducing latency for closed loop sidelink communications for non-terrestrial networks as described herein, or the processor 940 and the memory 930 may be otherwise configured to perform or support such operations.

Figure 10:
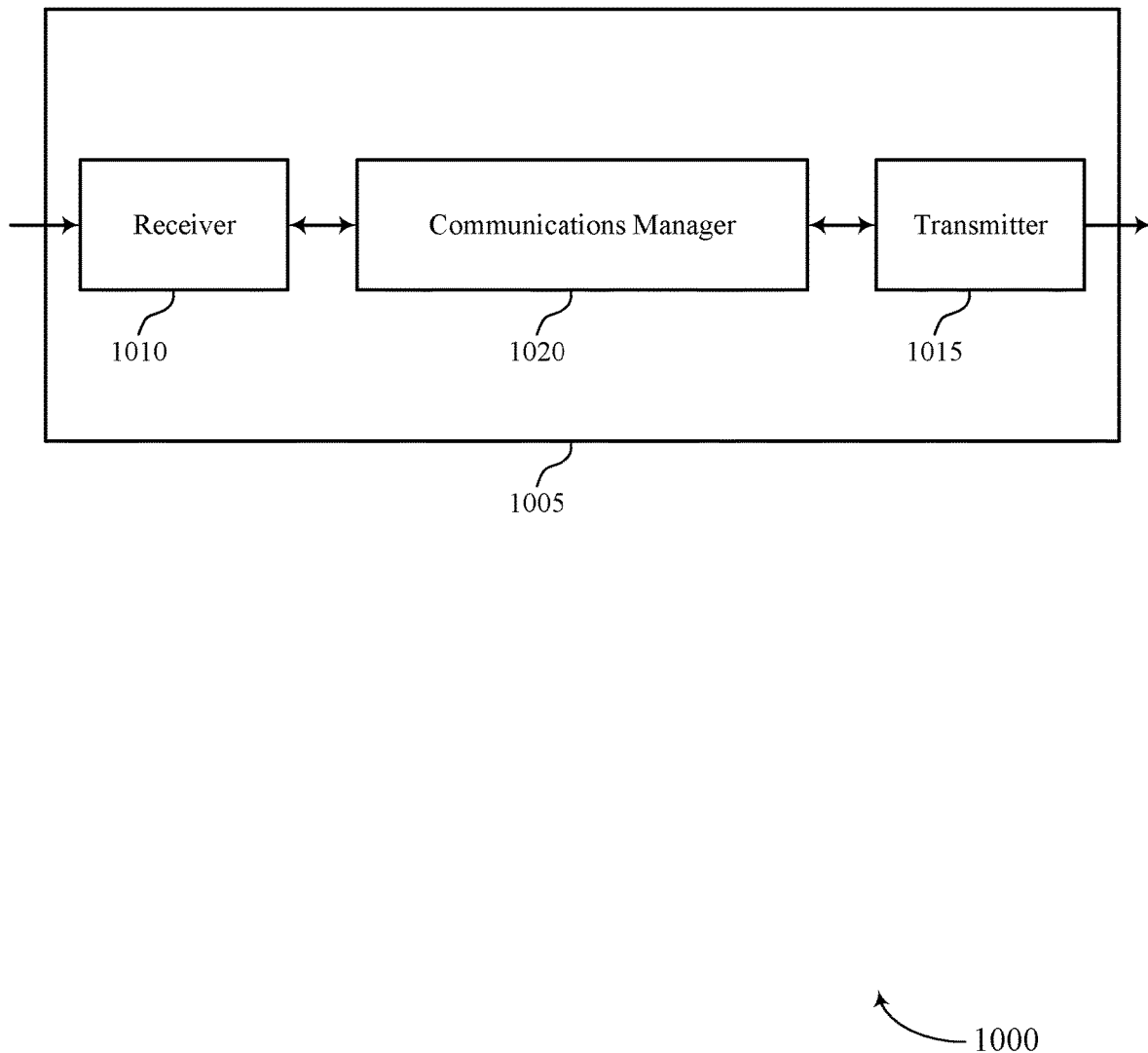
FIGS. 10 and 11 show block diagrams of devices that support reducing latency for closed loop sidelink communications for NTNs in accordance with aspects of the present disclosure.

FIG. 10 shows a block diagram 1000 of a device 1005 that supports reducing latency for closed loop sidelink communications for non-terrestrial networks in accordance with aspects of the present disclosure. The device 1005 may be an example of aspects of a network entity as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to reducing latency for closed loop sidelink communications for non-terrestrial networks). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to reducing latency for closed loop sidelink communications for non-terrestrial networks). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of reducing latency for closed loop sidelink communications for non-terrestrial networks as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a network entity in accordance with examples as disclosed herein. For example, the communications manager 1020 may be configured as or otherwise support a means for receiving, from a first wireless device, a message requesting both a first allocation of sidelink resources for the first wireless device to use to transmit to at least a second wireless device and a second allocation of sidelink resources for at least the second wireless device to use to transmit to at least the first wireless device. The communications manager 1020 may be configured as or otherwise support a means for transmitting, in response to the received request, an indication of a first set of sidelink resources for the first wireless device to the first wireless device and an indication of a second set of sidelink resources for the second wireless device.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for mitigating explicit resource allocation request signaling from the second wireless device, reducing signaling overhead, resulting in reduced processing, reduced power consumption, and more efficient utilization of communication resources.

Figure 11:
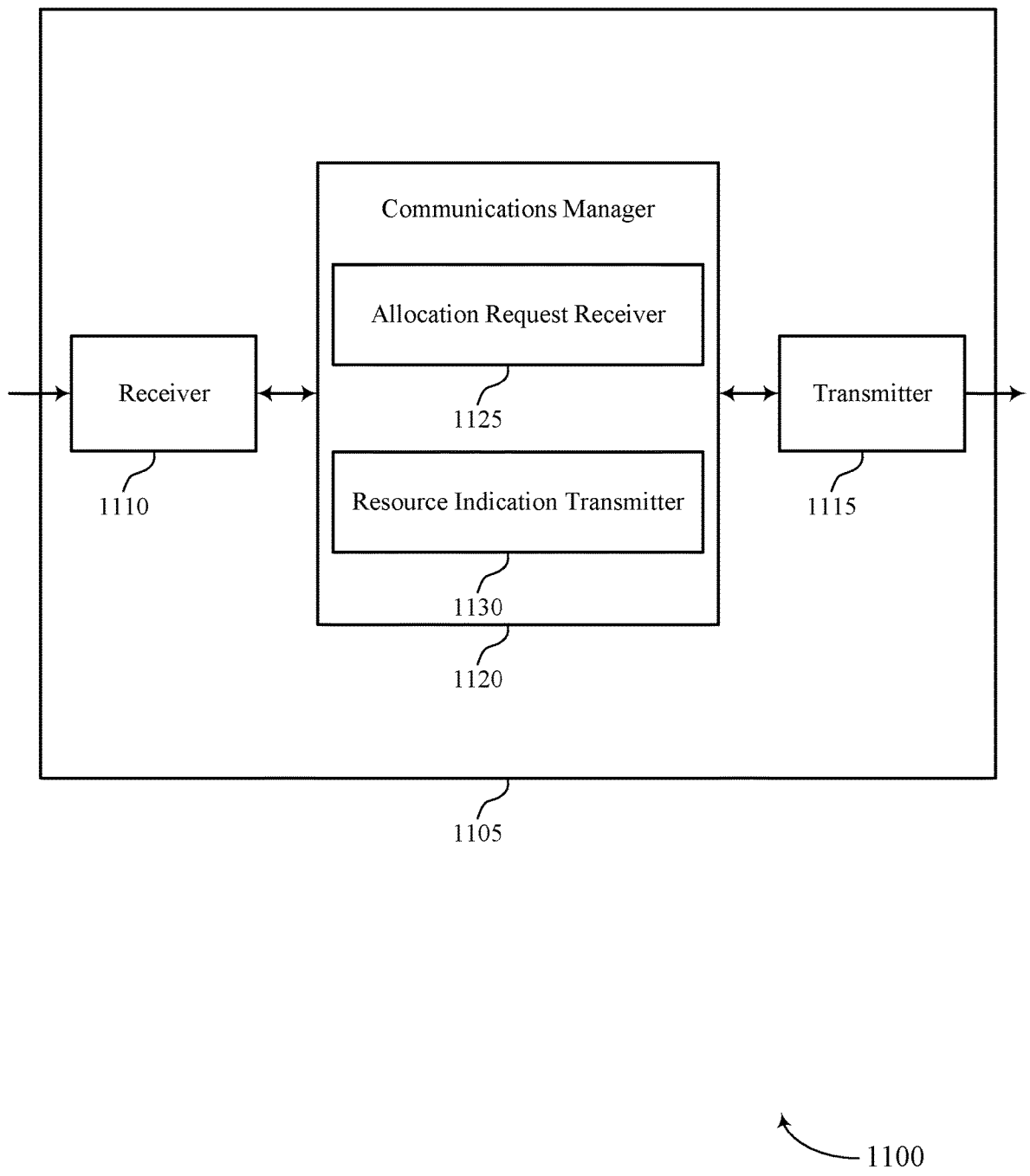

FIG. 11 shows a block diagram 1100 of a device 1105 that supports reducing latency for closed loop sidelink communications for non-terrestrial networks in accordance with aspects of the present disclosure. The device 1105 may be an example of aspects of a device 1005 or a network entity (e.g., a base station 105) as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to reducing latency for closed loop sidelink communications for non-terrestrial networks). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to reducing latency for closed loop sidelink communications for non-terrestrial networks). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of reducing latency for closed loop sidelink communications for non-terrestrial networks as described herein. For example, the communications manager 1120 may include an allocation request receiver 1125 a resource indication transmitter 1130, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a network entity in accordance with examples as disclosed herein. The allocation request receiver 1125 may be configured as or otherwise support a means for receiving, from a first wireless device, a message requesting both a first allocation of sidelink resources for the first wireless device to use to transmit to at least a second wireless device and a second allocation of sidelink resources for at least the second wireless device to use to transmit to at least the first wireless device. The resource indication transmitter 1130 may be configured as or otherwise support a means for transmitting, in response to the received request, an indication of a first set of sidelink resources for the first wireless device to the first wireless device and an indication of a second set of sidelink resources for the second wireless device.

Figure 12:
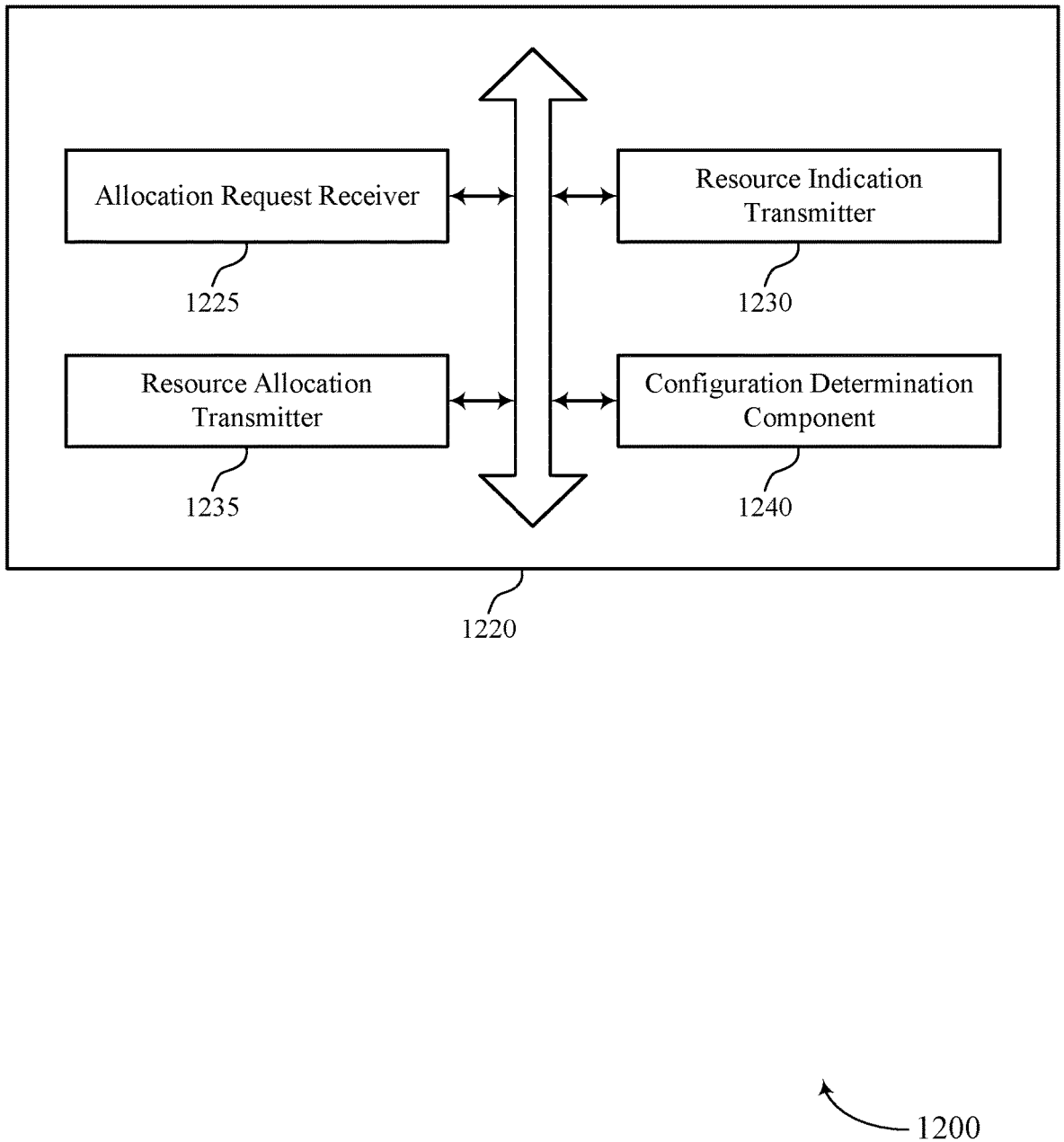
FIG. 12 shows a block diagram of a communications manager that supports reducing latency for closed loop sidelink communications for NTNs in accordance with aspects of the present disclosure.

FIG. 12 shows a block diagram 1200 of a communications manager 1220 that supports reducing latency for closed loop sidelink communications for non-terrestrial networks in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of reducing latency for closed loop sidelink communications for non-terrestrial networks as described herein. For example, the communications manager 1220 may include an allocation request receiver 1225, a resource indication transmitter 1230, a configuration determination component 1235, or any combination thereof. Each of these components may communicate, directly or indirectly, with one another (e.g., via one or more buses).

The communications manager 1220 may support wireless communication at a network entity in accordance with examples as disclosed herein. The allocation request receiver 1225 may be configured as or otherwise support a means for receiving, from a first wireless device, a message requesting both a first allocation of sidelink resources for the first wireless device to use to transmit to at least a second wireless device and a second allocation of sidelink resources for at least the second wireless device to use to transmit to at least the first wireless device. The resource indication transmitter 1230 may be configured as or otherwise support a means for transmitting, in response to the received request, an indication of a first set of sidelink resources for the first wireless device to the first wireless device and an indication of a second set of sidelink resources for the second wireless device.

In some examples, to support transmitting the indication of the first set of sidelink resources and the indication of the second set of sidelink resources, the resource indication transmitter 1230 may be configured as or otherwise support a means for transmitting, to the first wireless device in response to the received request, a message that includes both the indication of the first set of sidelink resources for the first wireless device and the indication of the second set of sidelink resources for the second wireless device.

In some examples, the resource indication transmitter 1230 may be configured as or otherwise support a means for transmitting, in the message indicating that the network entity will transmit a message identifying the second set of sidelink resources, an indication of a radio network temporary identifier, a time resource, a frequency resource, or any combination thereof, that the network entity will use to transmit the message identifying the second set of sidelink resources.

In some examples, the resource indication transmitter 1230 may be configured as or otherwise support a means for transmitting, to the first wireless device, an indication that the network entity will transmit to the second wireless device a message identifying the second set of sidelink resources for the second wireless device.

In some examples, to support transmitting the indication of the first set of sidelink resources and the indication of the second set of sidelink resources, the resource indication transmitter 1230 may be configured as or otherwise support a means for transmitting, to the first wireless device in response to the received request, a first message that includes the indication of the first set of sidelink resources for the first wireless device. In some examples, to support transmitting the indication of the first set of sidelink resources and the indication of the second set of sidelink resources, the resource indication transmitter 1230 may be configured as or otherwise support a means for transmitting, to the second wireless device in response to the received request and exclusive of a request from the second wireless device for the allocation of sidelink resources for the second wireless device, a second message that includes the indication of the second set of sidelink resources for the second wireless device.

In some examples, the configuration determination component 1235 may be configured as or otherwise support a means for determining, based on the received message requesting both the allocation of sidelink resources for the first wireless device and the allocation of sidelink resources for the second wireless device and a configuration from a set of configurations selected by the first wireless device for transmitting the message requesting both the allocation of sidelink resources for the first wireless device and the allocation of sidelink resources for the second wireless device, that the received message requests allocations of sidelink resources for both wireless devices of a sidelink.

In some examples, the selected configuration for the message includes at least one of a set of RACH preambles, a sidelink scheduling request configuration, a destination identifier of a BSR, or a logical channel group identifier of the BSR.

In some examples, the allocation request receiver 1225 may be configured as or otherwise support a means for receiving, in the message requesting both the allocation of sidelink resources for the first wireless device and the allocation of sidelink resources for the second wireless device, an indication of a size range, latency requirement, or both, for the indication of the second set of sidelink resources for the second wireless device.

Figure 13:
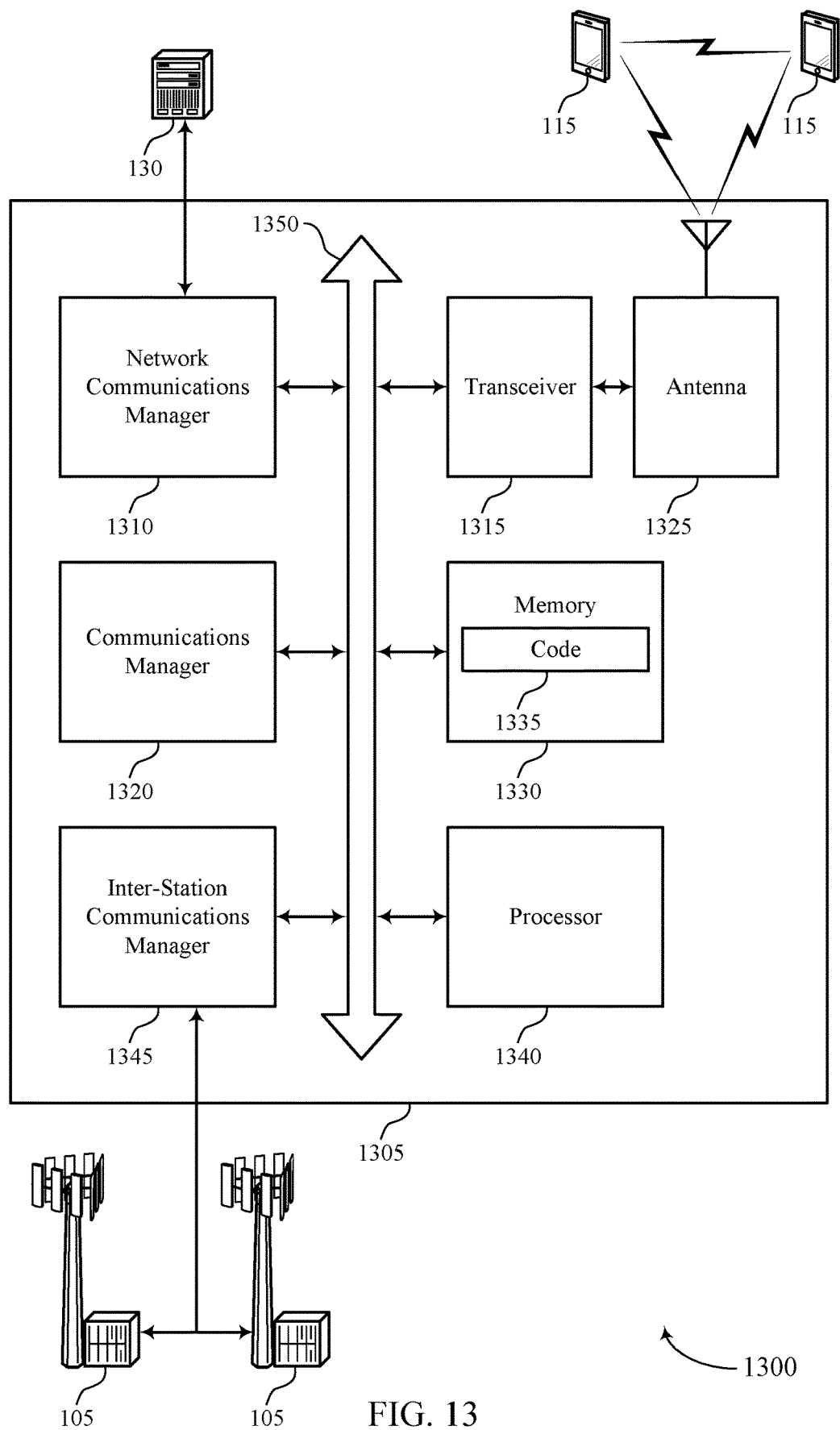
FIG. 13 shows a diagram of a system including a device that supports reducing latency for closed loop sidelink communications for NTNs in accordance with aspects of the present disclosure.

FIG. 13 shows a diagram of a system 1300 including a device 1305 that supports reducing latency for closed loop sidelink communications for non-terrestrial networks in accordance with aspects of the present disclosure. The device 1305 may be an example of or include the components of a device 1005, a device 1105, or a network entity as described herein. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting reducing latency for closed loop sidelink communications for non-terrestrial networks). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communication at a network entity in accordance with examples as disclosed herein. For example, the communications manager 1320 may be configured as or otherwise support a means for receiving, from a first wireless device, a message requesting both a first allocation of sidelink resources for the first wireless device to use to transmit to at least a second wireless device and a second allocation of sidelink resources for at least the second wireless device to use to transmit to at least the first wireless device. The communications manager 1320 may be configured as or otherwise support a means for transmitting, in response to the received request, an indication of a first set of sidelink resources for the first wireless device to the first wireless device and an indication of a second set of sidelink resources for the second wireless device.

By including or configuring the communications manager 1320 in accordance with examples as described herein, the device 1305 may support techniques for mitigating explicit resource allocation request signaling from the second wireless device, reducing signaling overhead, resulting in reduced latency, reduced power consumption, more efficient utilization of communication resources, improved coordination between devices, longer battery life, and improved utilization of processing capability.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of reducing latency for closed loop sidelink communications for non-terrestrial networks as described herein, or the processor 1340 and the memory 1330 may be otherwise configured to perform or support such operations.

Figure 14:
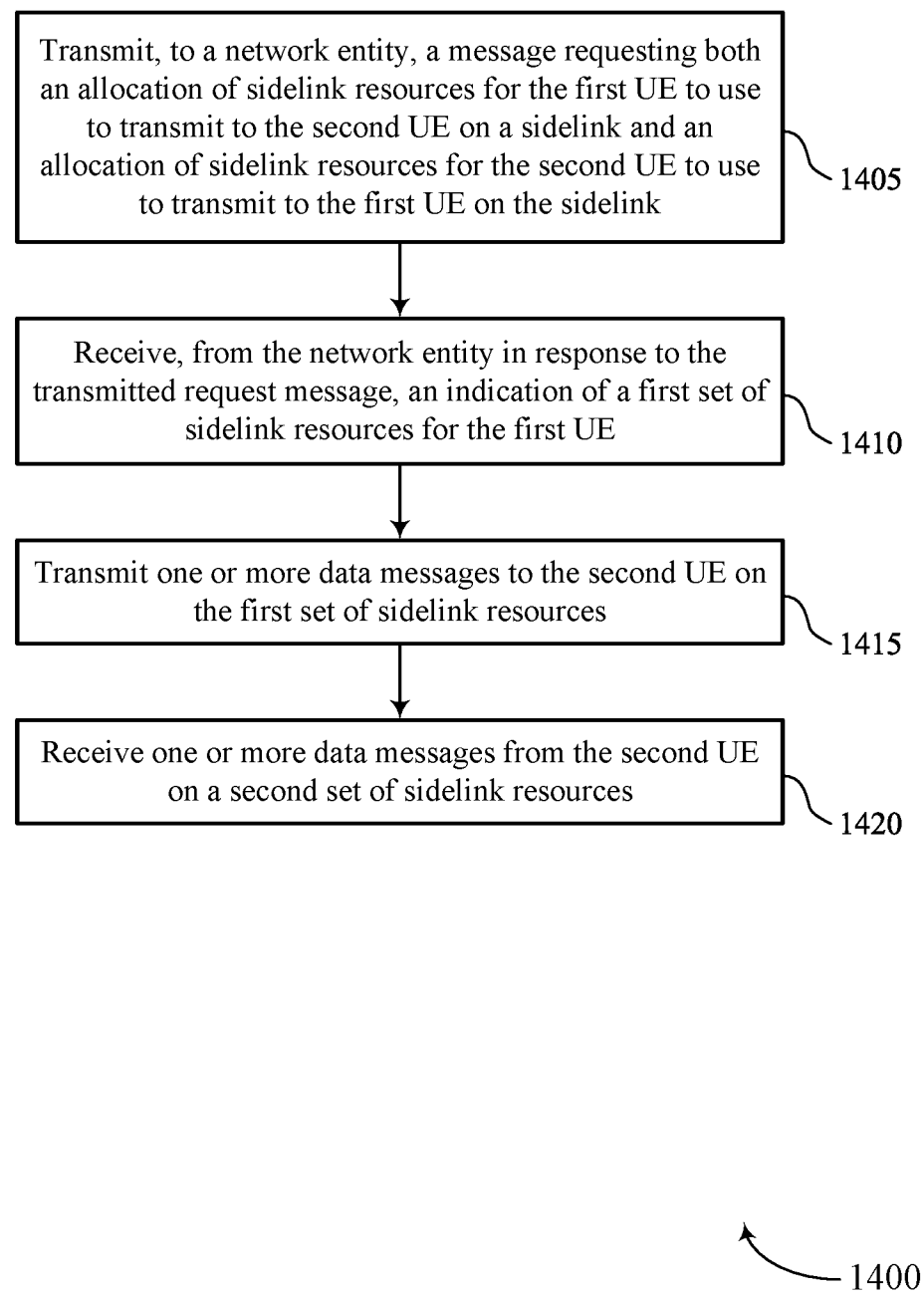
FIGS. 14 through 18 show flowcharts illustrating methods that support reducing latency for closed loop sidelink communications for NTNs in accordance with aspects of the present disclosure.

FIG. 14 shows a flowchart illustrating a method 1400 that supports reducing latency for closed loop sidelink communications for non-terrestrial networks in accordance with aspects of the present disclosure. The operations of the method 1400 may be implemented by a wireless device or its components as described herein. For example, the operations of the method 1400 may be performed by a wireless device as described with reference to FIGS. 1 through 9. In some examples, a wireless device may execute a set of instructions to control the functional elements of the wireless device to perform the described functions. Additionally or alternatively, the wireless device may perform aspects of the described functions using special-purpose hardware.

At 1405, the method may include transmitting a message requesting both an allocation of sidelink resources for the first wireless device to use to transmit to at least a second wireless device on a sidelink and an allocation of sidelink resources for at least the second wireless device to use to transmit to at least the first wireless device on the sidelink. The operations of 1405 may be performed in accordance with examples as disclosed herein. In some examples, aspects of the operations of 1405 may be performed by an allocation request transmitter 825 as described with reference to FIG. 8.

At 1410, the method may include receiving, in response to the transmitted request message, an indication of a first set of sidelink resources for the first wireless device. The operations of 1410 may be performed in accordance with examples as disclosed herein. In some examples, aspects of the operations of 1410 may be performed by a resource indication receiver 830 as described with reference to FIG. 8.

At 1415, the method may include transmitting one or more messages to at least the second wireless device on the first set of sidelink resources. The operations of 1415 may be performed in accordance with examples as disclosed herein. In some examples, aspects of the operations of 1415 may be performed by a message transmitter 835 as described with reference to FIG. 8.

At 1420, the method may include receiving one or more messages from at least the second wireless device on a second set of sidelink resources. The operations of 1420 may be performed in accordance with examples as disclosed herein. In some examples, aspects of the operations of 1420 may be performed by a message receiver 840 as described with reference to FIG. 8.

Figure 15:
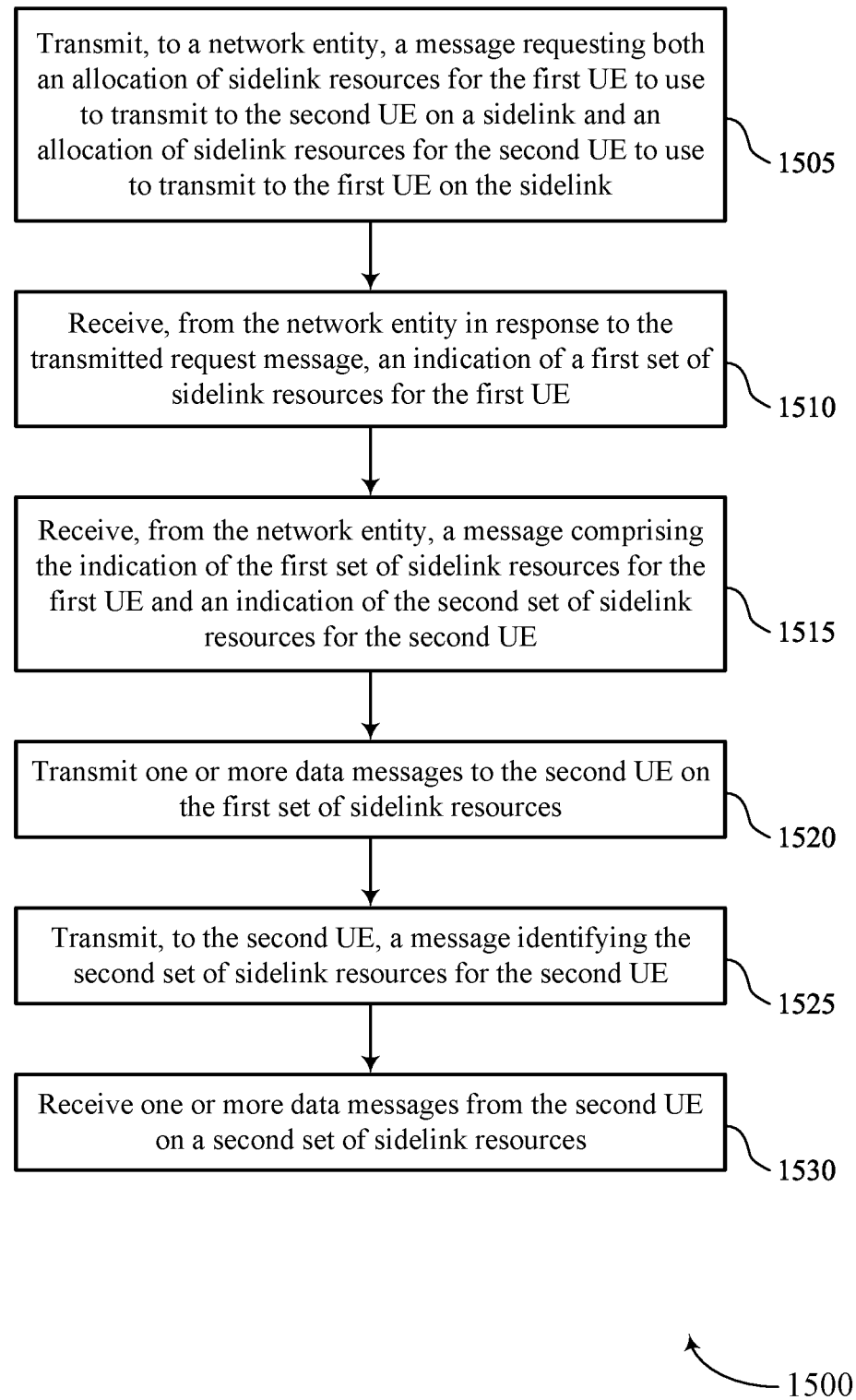

FIG. 15 shows a flowchart illustrating a method 1500 that supports reducing latency for closed loop sidelink communications for non-terrestrial networks in accordance with aspects of the present disclosure. The operations of the method 1500 may be implemented by a wireless device or its components as described herein. For example, the operations of the method 1500 may be performed by a wireless device as described with reference to FIGS. 1 through 9. In some examples, a wireless device may execute a set of instructions to control the functional elements of the wireless device to perform the described functions. Additionally or alternatively, the wireless device may perform aspects of the described functions using special-purpose hardware.

At 1505, the method may include transmitting a message requesting both an allocation of sidelink resources for the first wireless device to use to transmit to at least a second wireless device on a sidelink and an allocation of sidelink resources for at least the second wireless device to use to transmit to at least the first wireless device on the sidelink. The operations of 1505 may be performed in accordance with examples as disclosed herein. In some examples, aspects of the operations of 1505 may be performed by an allocation request transmitter 825 as described with reference to FIG. 8.

At 1510, the method may include receiving, in response to the transmitted request message, an indication of a first set of sidelink resources for the first wireless device. The operations of 1510 may be performed in accordance with examples as disclosed herein. In some examples, aspects of the operations of 1510 may be performed by a resource indication receiver 830 as described with reference to FIG. 8.

At 1515, the method may include receiving an indication of the second set of sidelink resources for at least the second wireless device. The operations of 1515 may be performed in accordance with examples as disclosed herein. In some examples, aspects of the operations of 1515 may be performed by a resource indication receiver 830 as described with reference to FIG. 8.

At 1520, the method may include transmitting one or more messages to at least the second wireless device on the first set of sidelink resources. The operations of 1520 may be performed in accordance with examples as disclosed herein. In some examples, aspects of the operations of 1520 may be performed by a message transmitter 835 as described with reference to FIG. 8.

At 1525, the method may include transmitting, to at least the second wireless device, a message identifying the second set of sidelink resources for at least the second wireless device. The operations of 1525 may be performed in accordance with examples as disclosed herein. In some examples, aspects of the operations of 1525 may be performed by a resource message transmitter 845 as described with reference to FIG. 8.

At 1530, the method may include receiving one or more messages from at least the second wireless device on a second set of sidelink resources. The operations of 1530 may be performed in accordance with examples as disclosed herein. In some examples, aspects of the operations of 1530 may be performed by a message receiver 840 as described with reference to FIG. 8.

Figure 16:
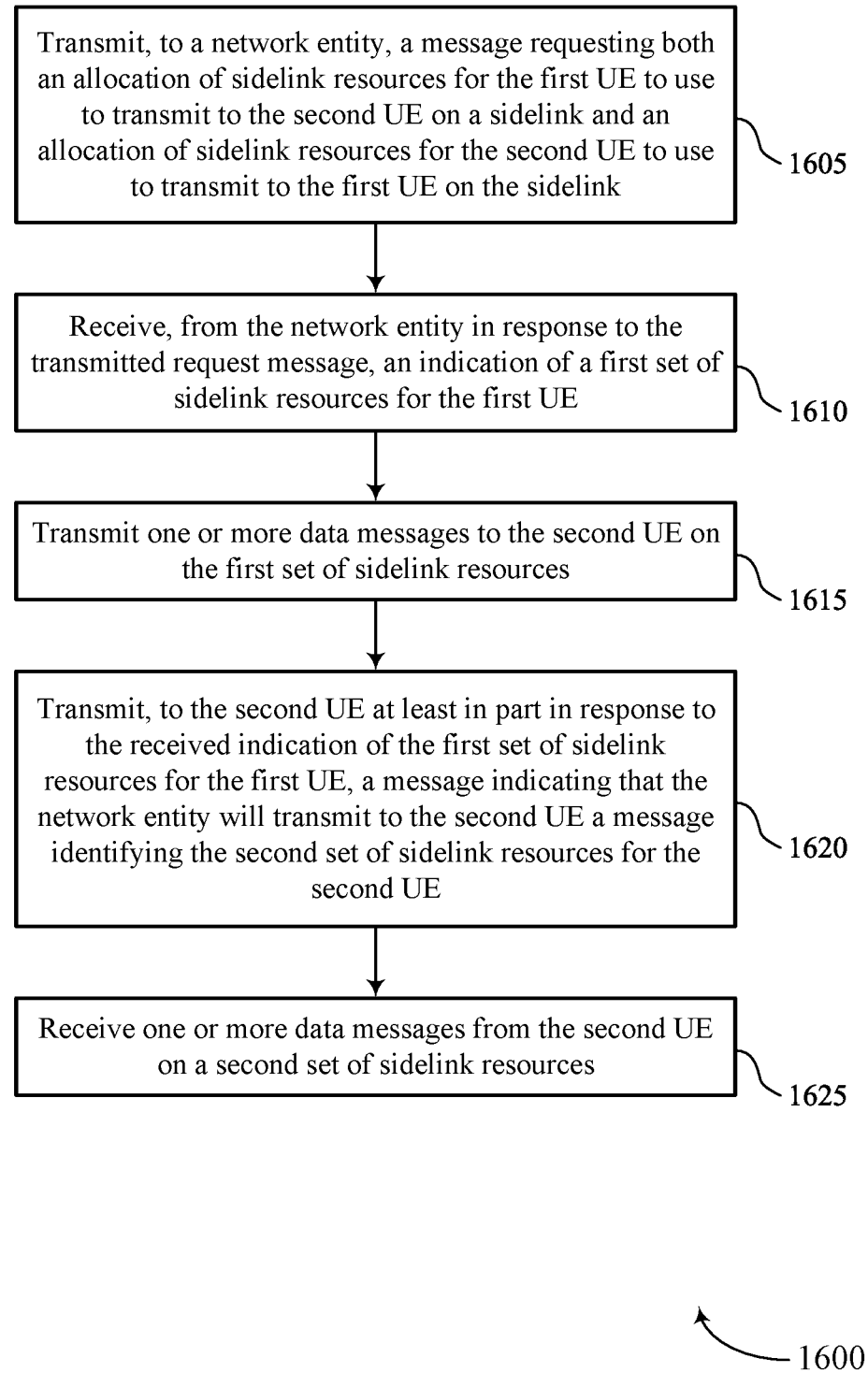

FIG. 16 shows a flowchart illustrating a method 1600 that supports reducing latency for closed loop sidelink communications for non-terrestrial networks in accordance with aspects of the present disclosure. The operations of the method 1600 may be implemented by a wireless device or its components as described herein. For example, the operations of the method 1600 may be performed by a wireless device as described with reference to FIGS. 1 through 9. In some examples, a wireless device may execute a set of instructions to control the functional elements of the wireless device to perform the described functions. Additionally or alternatively, the wireless device may perform aspects of the described functions using special-purpose hardware.

At 1605, the method may include transmitting a message requesting both an allocation of sidelink resources for the first wireless device to use to transmit to at least a second wireless device on a sidelink and an allocation of sidelink resources for at least the second wireless device to use to transmit to at least the first wireless device on the sidelink. The operations of 1605 may be performed in accordance with examples as disclosed herein. In some examples, aspects of the operations of 1605 may be performed by an allocation request transmitter 825 as described with reference to FIG. 8.

At 1610, the method may include receiving, in response to the transmitted request message, an indication of a first set of sidelink resources for the first wireless device. The operations of 1610 may be performed in accordance with examples as disclosed herein. In some examples, aspects of the operations of 1610 may be performed by a resource indication receiver 830 as described with reference to FIG. 8.

At 1615, the method may include transmitting one or more messages to at least the second wireless device on the first set of sidelink resources. The operations of 1615 may be performed in accordance with examples as disclosed herein. In some examples, aspects of the operations of 1615 may be performed by a message transmitter 835 as described with reference to FIG. 8.

At 1620, the method may include transmitting, to at least the second wireless device at least in part in response to the received indication of the first set of sidelink resources for the first wireless device, an indication that a network entity will transmit to at least the second wireless device a message identifying the second set of sidelink resources for at least the second wireless device. The operations of 1620 may be performed in accordance with examples as disclosed herein. In some examples, aspects of the operations of 1620 may be performed by a resource message transmitter 845 as described with reference to FIG. 8.

At 1625, the method may include receiving one or more messages from at least the second wireless device on a second set of sidelink resources. The operations of 1625 may be performed in accordance with examples as disclosed herein. In some examples, aspects of the operations of 1625 may be performed by a message receiver 840 as described with reference to FIG. 8.

Figure 17:
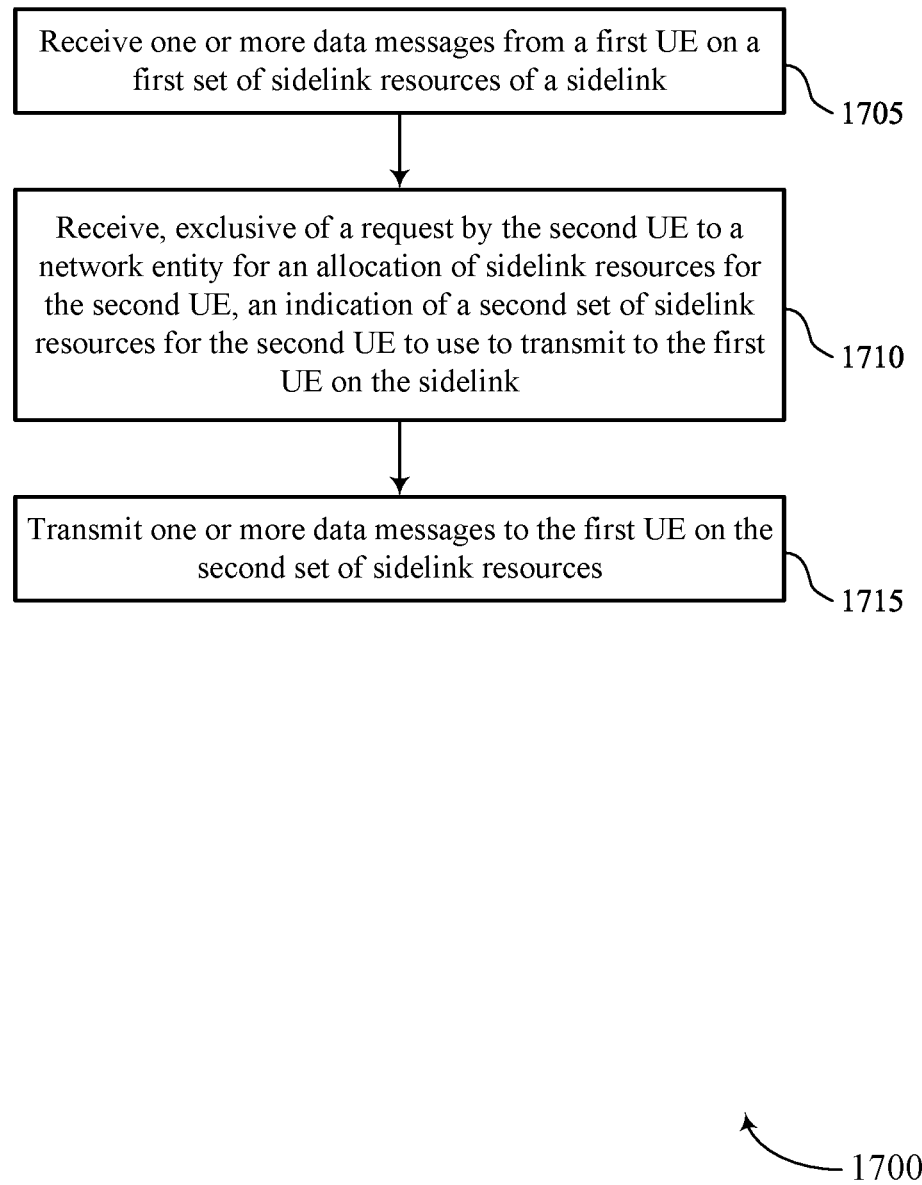

FIG. 17 shows a flowchart illustrating a method 1700 that supports reducing latency for closed loop sidelink communications for non-terrestrial networks in accordance with aspects of the present disclosure. The operations of the method 1700 may be implemented by a wireless device or its components as described herein. For example, the operations of the method 1700 may be performed by a wireless device as described with reference to FIGS. 1 through 9. In some examples, a wireless device may execute a set of instructions to control the functional elements of the wireless device to perform the described functions. Additionally or alternatively, the wireless device may perform aspects of the described functions using special-purpose hardware.

At 1705, the method may include receiving one or more messages from a first wireless device on a first set of sidelink resources of a sidelink. The operations of 1705 may be performed in accordance with examples as disclosed herein. In some examples, aspects of the operations of 1705 may be performed by a message receiver 840 as described with reference to FIG. 8.

At 1710, the method may include receiving, exclusive of a request by the second wireless device to a network entity for an allocation of sidelink resources for the second wireless device, an indication of a second set of sidelink resources for the second wireless device to use to transmit to at least the first wireless device on the sidelink in response to the one or more messages from the first wireless device. The operations of 1710 may be performed in accordance with examples as disclosed herein. In some examples, aspects of the operations of 1710 may be performed by a resource indication receiver 830 as described with reference to FIG. 8.

At 1715, the method may include transmitting one or more messages to the first wireless device on the second set of sidelink resources. The operations of 1715 may be performed in accordance with examples as disclosed herein.

In some examples, aspects of the operations of 1715 may be performed by a message transmitter 835 as described with reference to FIG. 8.

Figure 18:
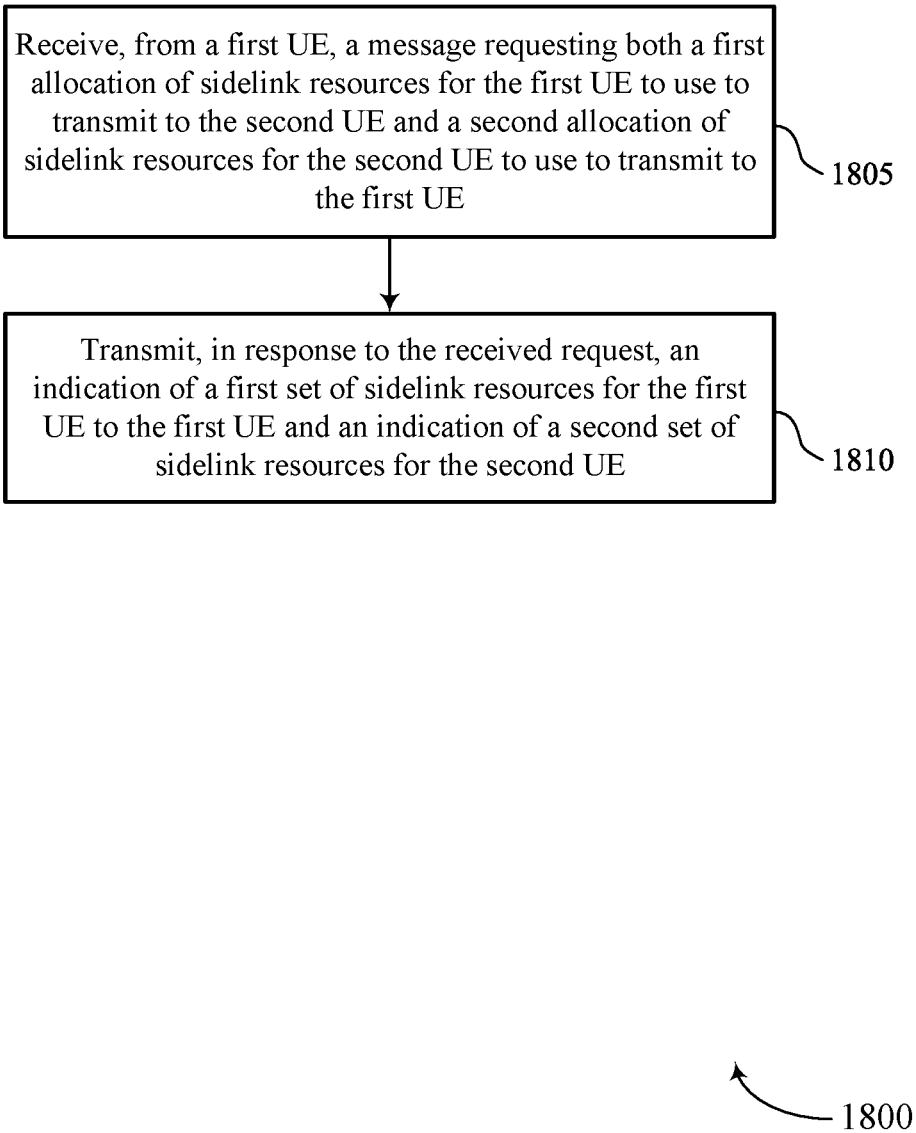

FIG. 18 shows a flowchart illustrating a method 1800 that supports reducing latency for closed loop sidelink communications for non-terrestrial networks in accordance with aspects of the present disclosure. The operations of the method 1800 may be implemented by a network entity or its components as described herein. For example, the operations of the method 1800 may be performed by a network entity as described with reference to FIGS. 1 through 5 and 10 through 13. In some examples, a network entity may execute a set of instructions to control the functional elements of the network entity to perform the described functions. Additionally or alternatively, the network entity may perform aspects of the described functions using special-purpose hardware.

At 1805, the method may include receiving, from a first wireless device, a message requesting both a first allocation of sidelink resources for the first wireless device to use to transmit to at least a second wireless device and a second allocation of sidelink resources for at least the second wireless device to use to transmit to at least the first wireless device. The operations of 1805 may be performed in accordance with examples as disclosed herein. In some examples, aspects of the operations of 1805 may be performed by an allocation request receiver 1225 as described with reference to FIG. 12.

At 1810, the method may include transmitting, in response to the received request, an indication of a first set of sidelink resources for the first wireless device to the first wireless device and an indication of a second set of sidelink resources for the second wireless device. The operations of 1810 may be performed in accordance with examples as disclosed herein. In some examples, aspects of the operations of 1810 may be performed by a resource indication transmitter 1230 as described with reference to FIG. 12.

The following provides an overview of aspects of the present disclosure:

Aspect 1: A method for wireless communication at a first wireless device, comprising: transmitting a message requesting both an allocation of sidelink resources for the first wireless device to use to transmit to at least a second wireless device on a sidelink and an allocation of sidelink resources for at least the second wireless device to use to transmit to at least the first wireless device on the sidelink; receiving, in response to the transmitted request message, an indication of a first set of sidelink resources for the first wireless device; transmitting one or more messages to at least the second wireless device on the first set of sidelink resources; and receiving one or more messages from at least the second wireless device on a second set of sidelink resources.

Aspect 2: The method of aspect 1, further comprising: receiving an indication of the second set of sidelink resources for at least the second wireless device; and transmitting, to at least the second wireless device, a message identifying the second set of sidelink resources for at least the second wireless device.

Aspect 3: The method of aspect 2, wherein at least one of the one or more messages transmitted to at least the second wireless device on the first set of sidelink resources identify the second set of sidelink resources for at least the second wireless device.

Aspect 4: The method of any of aspects 1 through 3, further comprising: transmitting, to at least the second wireless device at least in part in response to the received indication of the first set of sidelink resources for the first wireless device, an indication that a network entity will transmit to at least the second wireless device a message identifying the second set of sidelink resources for at least the second wireless device.

Aspect 5: The method of aspect 4, further comprising: receiving, from the network entity, the indication that the network entity will transmit to at least the second wireless device the message identifying the second set of sidelink resources for at least the second wireless device, wherein the indication transmitted to at least the second wireless device is transmitted in response to receiving the indication from the network entity.

Aspect 6: The method of any of aspects 4 through 5, wherein the indication that the network entity will transmit the message identifying the second set of sidelink resources is transmitted in at least one message of the one or more messages transmitted by the first wireless device to at least the second wireless device on the first set of sidelink resources.

Aspect 7: The method of any of aspects 4 through 6, further comprising: transmitting, in the message indicating that the network entity will transmit the second set of sidelink resources, an indication of a radio network temporary identifier, a time resource, a frequency resource, or any combination thereof, that the network entity will use to transmit the message identifying the second set of sidelink resources.

Aspect 8: The method of aspect 7, further comprising: receiving, from the network entity, the indication of the radio network temporary identifier, the time resource, the frequency resource, or any combination thereof.

Aspect 9: The method of any of aspects 1 through 8, wherein transmitting the message requesting both the allocation of sidelink resources for the first wireless device and the allocation of sidelink resources for at least the second wireless device comprises: selecting a configuration for the message from a set of configurations based at least in part on the configuration identifying that the message requests allocations of sidelink resources for both wireless devices of the sidelink; and transmitting, according to the selected configuration, the message requesting both the allocation of sidelink resources for the first wireless device and the allocation of sidelink resources for at least the second wireless device.

Aspect 10: The method of aspect 9, wherein the selected configuration for the message comprises one of a set of random access channel preambles, a sidelink scheduling request configuration, a destination identifier of a buffer status report, or a logical channel group identifier of the buffer status report.

Aspect 11: The method of any of aspects 1 through 10, further comprising: transmitting, in the message requesting both the allocation of sidelink resources for the first wireless device and the allocation of sidelink resources for at least the second wireless device, an indication of a size range, latency requirement, or both, for the second set of sidelink resources for at least the second wireless device.

Aspect 12: The method of any of aspects 1 through 11, wherein the message is transmitted to a base station of a non-terrestrial network, and the response to the transmitted request message is received from the base station of the non-terrestrial network.

Aspect 13: A method for wireless communication at a second wireless device, comprising: receiving one or more messages from a first wireless device on a first set of sidelink resources of a sidelink; receiving, exclusive of a request by the second wireless device to a network entity for an allocation of sidelink resources for the second wireless device, an indication of a second set of sidelink resources for the second wireless device to use to transmit to at least the first wireless device on the sidelink in response to the one or more messages from the first wireless device; and transmitting one or more messages to the first wireless device on the second set of sidelink resources.

Aspect 14: The method of aspect 13, further comprising: receiving, from the first wireless device, the indication of the second set of sidelink resources for the second wireless device.

Aspect 15: The method of aspect 14, wherein at least one of the one or more messages received from the first wireless device on the first set of sidelink resources of the sidelink identify the second set of sidelink resources for the second wireless device.

Aspect 16: The method of any of aspects 13 through 15, further comprising: receiving, from the first wireless device, an indication that the network entity will transmit to the second wireless device a message identifying the second set of sidelink resources for the second wireless device, the indication of the second set of sidelink resources to be received from the network entity based at least in part on receiving the indication that the network entity will transmit the message identifying the second set of sidelink resources.

Aspect 17: The method of aspect 16, wherein the indication that the network entity will transmit the message identifying the second set of sidelink resources is received in at least one message of the one or more messages received from the first wireless device on the first set of sidelink resources.

Aspect 18: The method of any of aspects 16 through 17, further comprising: receiving, in the message indicating that the network entity will transmit a message identifying the second set of sidelink resources, an indication of a radio network temporary identifier, a time resource, a frequency resource, or any combination thereof, that the network entity will use to transmit the message identifying the second set of sidelink resources.

Aspect 19: The method of any of aspects 13 through 18, wherein receiving the indication of the second set of sidelink resources comprises: identifying, at least one of a radio network temporary identifier or a preconfigured set of resources for the second wireless device to use to receive the indication of the second set of sidelink resources from the network entity; and receiving the indication of the second set of sidelink resources from the network entity according to the at least one of the radio network temporary identifier or the preconfigured set of resources.

Aspect 20: The method of any of aspects 13 through 19, wherein the network entity comprises a base station of a non-terrestrial network.

Aspect 21: A method for wireless communication at a network entity, comprising: receiving, from a first wireless device, a message requesting both an allocation of sidelink resources for the first wireless device to use to transmit to at least a second wireless device and an allocation of sidelink resources for at least the second wireless device to use to transmit to at least the first wireless device; and transmitting, in response to the received request, an indication of a first set of sidelink resources for the first wireless device to the first wireless device and an indication of a second set of sidelink resources for the second wireless device.

Aspect 22: The method of aspect 21, wherein transmitting the indication of the first set of sidelink resources and the indication of the second set of sidelink resources comprises:

transmitting, to the first wireless device in response to the received request, a message that includes both the indication of the first set of sidelink resources for the first wireless device and the indication of the second set of sidelink resources for the second wireless device.

Aspect 23: The method of aspect 22, further comprising: transmitting, in the message indicating that the network entity will transmit a message identifying the second set of sidelink resources, an indication of a radio network temporary identifier, a time resource, a frequency resource, or any combination thereof, that the network entity will use to transmit the message identifying the second set of sidelink resources.

Aspect 24: The method of any of aspects 21 through 23, further comprising: transmitting, to the first wireless device, an indication that the network entity will transmit to the second wireless device a message identifying the second set of sidelink resources for the second wireless device.

Aspect 25: The method of any of aspects 21 through 24, wherein transmitting the indication of the first set of sidelink resources and the indication of the second set of sidelink resources comprises: transmitting, to the first wireless device in response to the received request, a first message that includes the indication of the first set of sidelink resources for the first wireless device; and transmitting, to the second wireless device in response to the received request and exclusive of a request from the second wireless device for the allocation of sidelink resources for the second wireless device, a second message that includes the indication of the second set of sidelink resources for the second wireless device.

Aspect 26: The method of any of aspects 21 through 25, further comprising: determining, based at least in part on the received message requesting both the allocation of sidelink resources for the first wireless device and the allocation of sidelink resources for the second wireless device and a configuration from a set of configurations selected by the first wireless device for transmitting the message requesting both the allocation of sidelink resources for the first wireless device and the allocation of sidelink resources for the second wireless device, that the received message requests allocations of sidelink resources for both wireless devices of a sidelink.

Aspect 27: The method of aspect 26, wherein the selected configuration for the message comprises at least one of a set of random access channel preambles, a sidelink scheduling request configuration, a destination identifier of a buffer status report, or a logical channel group identifier of the buffer status report.

Aspect 28: The method of any of aspects 21 through 27, further comprising: receiving, in the message requesting both the allocation of sidelink resources for the first wireless device and the allocation of sidelink resources for the second wireless device, an indication of a size range, latency requirement, or both, for the indication of the second set of sidelink resources for the second wireless device.

Aspect 29: An apparatus for wireless communication at a first wireless device, comprising a processor; memory coupled with the processor; and instructions stored in the memory and executable by the processor to cause the apparatus to perform a method of any of aspects 1 through 12.

Aspect 30: An apparatus for wireless communication at a first wireless device, comprising at least one means for performing a method of any of aspects 1 through 12.

Aspect 31: A non-transitory computer-readable medium storing code for wireless communication at a first wireless device, the code comprising instructions executable by a processor to perform a method of any of aspects 1 through 12.

Aspect 32: An apparatus for wireless communication at a second wireless device, comprising a processor; memory coupled with the processor; and instructions stored in the memory and executable by the processor to cause the apparatus to perform a method of any of aspects 13 through 20.

Aspect 33: An apparatus for wireless communication at a second wireless device, comprising at least one means for performing a method of any of aspects 13 through 20.

Aspect 34: A non-transitory computer-readable medium storing code for wireless communication at a second wireless device, the code comprising instructions executable by a processor to perform a method of any of aspects 13 through 20.

Aspect 35: An apparatus for wireless communication at a network entity, comprising a processor; memory coupled with the processor; and instructions stored in the memory and executable by the processor to cause the apparatus to perform a method of any of aspects 21 through 28.

Aspect 36: An apparatus for wireless communication at a network entity, comprising at least one means for performing a method of any of aspects 21 through 28.

Aspect 37: A non-transitory computer-readable medium storing code for wireless communication at a network entity, the code comprising instructions executable by a processor to perform a method of any of aspects 21 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first wireless device, comprising:
   transmitting, to a base station of a non-terrestrial network, a message requesting both an allocation of sidelink resources for the first wireless device to use to transmit to at least a second wireless device on a sidelink and an allocation of sidelink resources for at least the second wireless device to use to transmit to at least the first wireless device on the sidelink;
   receiving, from the base station of the non-terrestrial network and in response to the transmitted request message, an indication of a first set of sidelink resources for the first wireless device;
   transmitting one or more messages to at least the second wireless device on the first set of sidelink resources; and
   receiving one or more messages from at least the second wireless device on a second set of sidelink resources.

2. The method of claim 1, further comprising:
   receiving an indication of the second set of sidelink resources for at least the second wireless device; and
   transmitting, to at least the second wireless device, a message identifying the second set of sidelink resources for at least the second wireless device.

3. The method of claim 2, wherein at least one of the one or more messages transmitted to at least the second wireless device on the first set of sidelink resources identify the second set of sidelink resources for at least the second wireless device.

4. The method of claim 1, further comprising:
transmitting, to at least the second wireless device at least in part in response to the received indication of the first set of sidelink resources for the first wireless device, an indication that the base station will transmit to at least the second wireless device a message identifying the second set of sidelink resources for at least the second wireless device.

5. The method of claim 4, further comprising:
receiving, from the base station, the indication that the base station will transmit to at least the second wireless device the message identifying the second set of sidelink resources for at least the second wireless device, wherein the indication transmitted to at least the second wireless device is transmitted in response to receiving the indication from the base station.

6. The method of claim 4, wherein the indication that the base station will transmit the message identifying the second set of sidelink resources is transmitted in at least one message of the one or more messages transmitted by the first wireless device to at least the second wireless device on the first set of sidelink resources.

7. The method of claim 4, further comprising:
transmitting, in the message indicating that the base station will transmit the second set of sidelink resources, an indication of a radio network temporary identifier, a time resource, a frequency resource, or any combination thereof, that the base station will use to transmit the message identifying the second set of sidelink resources.

8. The method of claim 7, further comprising:
receiving, from the base station, the indication of the radio network temporary identifier, the time resource, the frequency resource, or any combination thereof.

9. The method of claim 1, wherein transmitting the message requesting both the allocation of sidelink resources for the first wireless device and the allocation of sidelink resources for at least the second wireless device comprises:
selecting a configuration for the message from a set of configurations based at least in part on the configuration identifying that the message requests allocations of sidelink resources for both wireless devices of the sidelink; and
transmitting, according to the selected configuration, the message requesting both the allocation of sidelink resources for the first wireless device and the allocation of sidelink resources for at least the second wireless device.

10. The method of claim 9, wherein the selected configuration for the message comprises one of a set of random access channel preambles, a sidelink scheduling request configuration, a destination identifier of a buffer status report, or a logical channel group identifier of the buffer status report.

11. The method of claim 1, further comprising:
transmitting, in the message requesting both the allocation of sidelink resources for the first wireless device and the allocation of sidelink resources for at least the second wireless device, an indication of a size range, latency requirement, or both, for the second set of sidelink resources for at least the second wireless device.

12. A method for wireless communication at a second wireless device, comprising:
receiving one or more messages from a first wireless device on a first set of sidelink resources of a sidelink;
receiving, exclusive of a request by the second wireless device to a base station of a non-terrestrial network for an allocation of sidelink resources for the second wireless device, an indication of a second set of sidelink resources for the second wireless device to use to transmit to at least the first wireless device on the sidelink in response to the one or more messages from the first wireless device; and
transmitting one or more messages to the first wireless device on the second set of sidelink resources.

13. The method of claim 12, further comprising:
receiving, from the first wireless device, the indication of the second set of sidelink resources for the second wireless device.

14. The method of claim 13, wherein at least one of the one or more messages received from the first wireless device on the first set of sidelink resources of the sidelink identify the second set of sidelink resources for the second wireless device.

15. The method of claim 12, further comprising:
receiving, from the first wireless device, an indication that the base station will transmit to the second wireless device a message identifying the second set of sidelink resources for the second wireless device, the indication of the second set of sidelink resources to be received from the base station based at least in part on receiving the indication that the base station will transmit the message identifying the second set of sidelink resources.

16. The method of claim 15, wherein the indication that the base station will transmit the message identifying the second set of sidelink resources is received in at least one message of the one or more messages received from the first wireless device on the first set of sidelink resources.

17. The method of claim 15, further comprising:
receiving, in the message indicating that the base station will transmit a message identifying the second set of sidelink resources, an indication of a radio network temporary identifier, a time resource, a frequency resource, or any combination thereof, that the base station will use to transmit the message identifying the second set of sidelink resources.

18. The method of claim 12, wherein receiving the indication of the second set of sidelink resources comprises:
identifying, at least one of a radio network temporary identifier or a preconfigured set of resources for the second wireless device to use to receive the indication of the second set of sidelink resources from the base station; and
receiving the indication of the second set of sidelink resources from the base station according to the at least one of the radio network temporary identifier or the preconfigured set of resources.

19. A method for wireless communication at a network entity, comprising:
receiving, from a first wireless device, a message requesting both an allocation of sidelink resources for the first wireless device to use to transmit to at least a second wireless device and an allocation of sidelink resources for at least the second wireless device to use to transmit to at least the first wireless device; and
transmitting, in response to the received request, an indication of a first set of sidelink resources for the first wireless device to the first wireless device and an indication of a second set of sidelink resources for the second wireless device wherein the network entity is a base station of a non-terrestrial network.

20. The method of claim 19, wherein transmitting the indication of the first set of sidelink resources and the indication of the second set of sidelink resources comprises:
transmitting, to the first wireless device in response to the received request, a message that includes both the indication of the first set of sidelink resources for the first wireless device and the indication of the second set of sidelink resources for the second wireless device.

21. The method of claim 20, further comprising:
transmitting, in the message indicating that the base station will transmit a message identifying the second set of sidelink resources, an indication of a radio network temporary identifier, a time resource, a frequency resource, or any combination thereof, that the base station will use to transmit the message identifying the second set of sidelink resources.

22. The method of claim 19, further comprising:
transmitting, to the first wireless device, an indication that the base station will transmit to the second wireless device a message identifying the second set of sidelink resources for the second wireless device.

23. The method of claim 19, wherein transmitting the indication of the first set of sidelink resources and the indication of the second set of sidelink resources comprises:
transmitting, to the first wireless device in response to the received request, a first message that includes the indication of the first set of sidelink resources for the first wireless device; and
transmitting, to the second wireless device in response to the received request and exclusive of a request from the second wireless device for the allocation of sidelink resources for the second wireless device, a second message that includes the indication of the second set of sidelink resources for the second wireless device.

24. The method of claim 19, further comprising:
determining, based at least in part on the received message requesting both the allocation of sidelink resources for the first wireless device and the allocation of sidelink resources for the second wireless device and a configuration from a set of configurations selected by the first wireless device for transmitting the message requesting both the allocation of sidelink resources for the first wireless device and the allocation of sidelink resources for the second wireless device, that the received message requests allocations of sidelink resources for both wireless devices of a sidelink.

25. The method of claim 24, wherein the selected configuration for the message comprises at least one of a set of random access channel preambles, a sidelink scheduling request configuration, a destination identifier of a buffer status report, or a logical channel group identifier of the buffer status report.

26. The method of claim 19, further comprising:
receiving, in the message requesting both the allocation of sidelink resources for the first wireless device and the allocation of sidelink resources for the second wireless device, an indication of a size range, latency requirement, or both, for the indication of the second set of sidelink resources for the second wireless device.

27. An apparatus for wireless communication at a first wireless device, comprising:
a processor; memory coupled with the processor; and
instructions stored in the memory and executable by the processor to cause the apparatus to:
transmit, to a base station of a non-terrestrial network, a message requesting both an allocation of sidelink resources for the first wireless device to use to transmit to at least a second wireless device on a sidelink and an allocation of sidelink resources for at least the second wireless device to use to transmit to at least the first wireless device on the sidelink;
receive, from the base station of the non-terrestrial network and in response to the transmitted request message, an indication of a first set of sidelink resources for the first wireless device;
transmit one or more messages to at least the second wireless device on the first set of sidelink resources; and
receive one or more messages from at least the second wireless device on a second set of sidelink resources.

28. The apparatus of claim 27, wherein the instructions are further executable by the processor to cause the apparatus to:
receive an indication of the second set of sidelink resources for at least the second wireless device; and
transmit, to at least the second wireless device, a message identifying the second set of sidelink resources for at least the second wireless device.

* * * * *